(12) United States Patent
Yamamoto et al.

(10) Patent No.: US 8,694,176 B2
(45) Date of Patent: Apr. 8, 2014

(54) POWER CONTROL METHOD, AND POWER CONTROL APPARATUS

(75) Inventors: Hiroshi Yamamoto, Nagaoka (JP);
Kazumasa Ushiki, Kawasaki (JP);
Tadanobu Tsunoda, Kawasaki (JP);
Nobutsugu Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 579 days.

(21) Appl. No.: 13/072,886

(22) Filed: Mar. 28, 2011

(65) Prior Publication Data
US 2011/0257803 A1 Oct. 20, 2011

(30) Foreign Application Priority Data

Apr. 16, 2010 (JP) ................................. 2010-095154

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)

(52) U.S. Cl.
USPC ............ 700/297; 700/286; 700/291; 700/295

(58) Field of Classification Search
USPC .................................. 700/286, 291, 295, 297
See application file for complete search history.

(56) References Cited

U.S. PATENT DOCUMENTS

| 5,237,507 | A  | * | 8/1993  | Chasek | 705/412 |
| 8,068,938 | B2 | * | 11/2011 | Fujita | 700/295 |
| 8,554,383 | B2 | * | 10/2013 | Toba et al. | 700/291 |

| 2004/0093124 | A1 | * | 5/2004  | Havlena | 700/291 |
| 2011/0137482 | A1 | * | 6/2011  | Toba et al. | 700/291 |
| 2012/0065792 | A1 | * | 3/2012  | Yonezawa et al. | 700/291 |
| 2012/0083927 | A1 | * | 4/2012  | Nakamura et al. | 700/278 |
| 2012/0296482 | A1 | * | 11/2012 | Steven et al. | 700/291 |
| 2012/0310428 | A1 | * | 12/2012 | Katagi et al. | 700/292 |
| 2013/0096983 | A1 | * | 4/2013  | Forbes et al. | 705/7.31 |
| 2013/0150993 | A1 | * | 6/2013  | Miyazaki et al. | 700/97 |
| 2013/0166133 | A1 | * | 6/2013  | Ikeda et al. | 701/23 |

FOREIGN PATENT DOCUMENTS

| JP | 08-287958   | 11/1996 |
| JP | 2001-008385 | 1/2001  |
| JP | 2003-244840 | 8/2003  |
| JP | 2005-218193 | 8/2005  |

* cited by examiner

*Primary Examiner* — Ronald D. Hartman, Jr.
(74) *Attorney, Agent, or Firm* — Fujitsu Patent Center

(57) ABSTRACT

A power control method for a power supplying unit for supplying power from a commercial power supply and a battery to a load. The method includes (a) calculating a deviation amount between an actual power demand and a predicted power demand in a predetermined unit period on the basis of power demand transition data and power demand prediction data, (b) correcting, by a computer, a leveling target value on the basis of the calculated deviation amount, and (c) controlling the power supplying unit so that the power supplying unit supplies power corresponding to the corrected leveling target value from the commercial power supply. The power demand transition data is stored in a power database, and the power demand prediction data is stored in a prediction data storing unit. The leveling target value is a target value of power to be supplied from the commercial power supply.

14 Claims, 23 Drawing Sheets

FIG. 3

| DATE | AMOUNT OF ELECTRICITY (kWh) |
|---|---|
| ... | ... |
| 8/3/2009 11:00 | 10.2423 |
| 8/3/2009 11:01 | 9.8851 |
| 8/3/2009 11:02 | 10.0587 |

FIG. 4

| DATE | AMOUNT OF ELECTRICITY (kW) |
|---|---|
| ... | ... |
| 8/3/2009 11:00 | 9.8634 |
| 8/3/2009 11:01 | 10.2145 |
| 8/3/2009 11:02 | 9.1529 |

FIG. 5

| DATE | AMOUNT OF ELECTRICITY (kW) |
|---|---|
| ... | ... |
| 8/3/2009 8:00 | 4.1555 |
| 8/3/2009 8:30 | 7.1624 |
| 8/3/2009 9:00 | 9.3526 |

FIG. 6

| CHARACTERISTIC | DATE | AMOUNT OF ELECTRICITY (kW) |
|---|---|---|
| MONDAY | 0:00 | 4.1053 |
| | 0:30 | 4.0858 |
| | ... | ... |
| | 23:30 | 4.1165 |
| ... | ... | ... |

POWER CONTROL METHOD, AND POWER CONTROL APPARATUS

CROSS-REFERENCE TO RELATED APPLICATION

This application is based upon and claims the benefit of priority of the prior Japanese Patent Application No. 2010-095154, filed on Apr. 16, 2010, the entire contents of which are incorporated herein by reference.

FIELD

The embodiments disclosed herein relate to technologies which control power to be supplied from a commercial power supply.

BACKGROUND

In recent years, many efforts have been made widely for suppressing a peak of a power load for power load leveling.

Leveling a power load allows stable power supply from a power supplier (such as electric power company) and can eliminate the necessity for preparation of excessive electric power generation equipment costs for a power load peak. Shifting daytime power loads to the nighttime in which a lower proportion of power is generated by thermal power generation can reduce the amount of carbon dioxide exhausted when a unit amount of electricity is generated. On the other hand, a power consumer (such as an office and a factory) can advantageously reduce the power receiving equipment costs and/or electricity charge.

By the way, in order to level power loads, a power consumer may prepare a battery, and the battery is discharged in a time zone with a large power load so that the peak value of power to be supplied from a commercial power supply can be suppressed.

For example, when power supplied from a commercial system exceeds a predetermined value, the excess amount of power may be discharged from a power storage device so as to control the power to be supplied from a commercial system so as not to be higher than a desirable value (target demand value). However, according to this technology, the discharging from a power storage device may not address a power demand increase which is much higher than expected. For that, power which is greatly higher than the desirable value is supplied from the commercial system.

Reference may be made to Japanese Laid-open Patent Publication No. 2003-244840.

SUMMARY

According to an aspect of the embodiments, a power control method for a power supplying unit for supplying power from a commercial power supply and a battery to a load, includes calculating a deviation amount between an actual power demand and a predicted power demand in a predetermined unit period on the basis of power demand transition data and power demand prediction data, the power demand transition data being stored in a power database, the power demand prediction data being stored in a prediction data storing unit, correcting, by a computer, a leveling target value on the basis of the calculated deviation amount, the leveling target value being a target value of power to be supplied from the commercial power supply, and controlling the power supplying unit so that the power supplying unit supplies power corresponding to the corrected leveling target value from the commercial power supply.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of data stored in a battery DB;

FIG. 4 illustrates an example of data stored in a power demand DB;

FIG. 5 illustrates an example of data stored in an analysis data storage unit;

FIG. 6 illustrates an example of data stored in a prediction data storing unit;

DESCRIPTION OF EMBODIMENTS

First Embodiment

Figure 1:
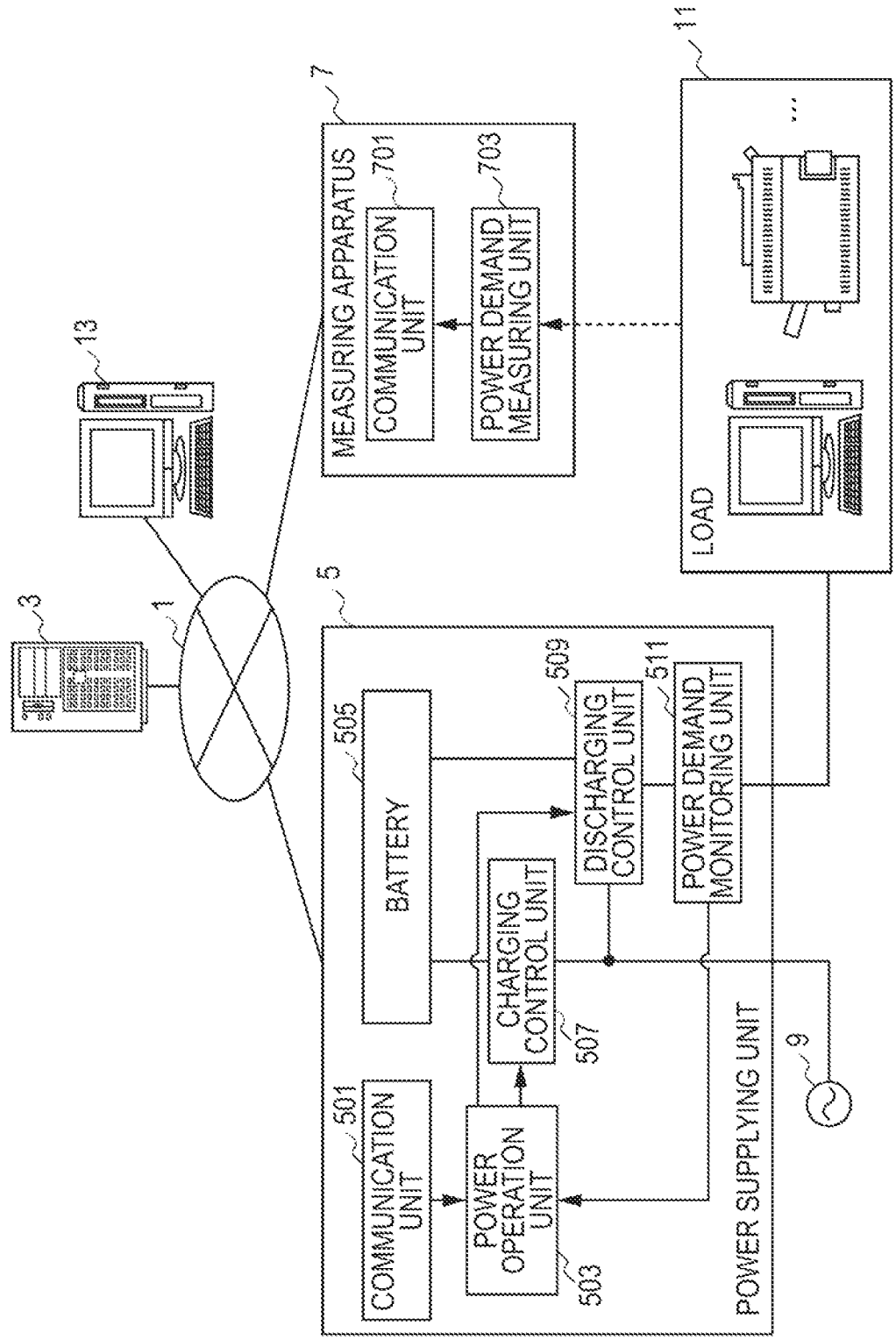
FIG. 1 is a configuration diagram of a system according to an embodiment of the present technology.

FIG. 1 is a configuration diagram of a system according to an embodiment. For example, to a network 1 which is an intra LAN (Local Area Network), a power management server 3, a power supplying unit 5, a measuring apparatus 7, and a management terminal 13 are connected. Furthermore, for example, a commercial power supply 9 which is a power receiving apparatus supplies power to the power supplying unit 5. The power supplying unit 5 may be an Uninterruptible Power Supply (UPS), for example, and may supply power to a load 11 which is an apparatus that consumes power, such as a personal computer, a printer, and a lighting, for example.

The power supplying unit 5 includes a communication unit 501, a power operation unit 503, a battery 505, a charging control unit 507, a discharging control unit 509, and a power demand monitoring unit 511.

The communication unit 501 performs processing including transmitting data on a remaining battery level to the power management server 3 and receiving a control request including data on a desirable value (hereinafter called a leveling desirable value) of maximum power to be supplied from the commercial power supply 9 from the power management server 3. The power operation unit 503 calculates charge power and discharge power and performs processing including instructing the charging control unit 507 to charge the calculated charge power and instructing the discharging control unit 509 to discharge the calculated discharge power. The charging control unit 507 performs processing including charging the charge power instructed by the power operation unit 503 to the battery 505 and measuring a remaining battery level and notifying it to the power operation unit 503. The discharging control unit 509 performs processing including discharging the discharge power instructed from the power operation unit 503 to the load 11. The power demand monitoring unit 511 performs processing including measuring the power demand of the load 11 and notifying it to the power operation unit 503.

The measuring apparatus 7 includes a communication unit 701 and a power demand measuring unit 703.

The communication unit 701 transmits data on a power demand to the power management server 3. The power demand measuring unit 703 measures the power demand of the load 11 and notifies it to the communication unit 701.

Figure 2:
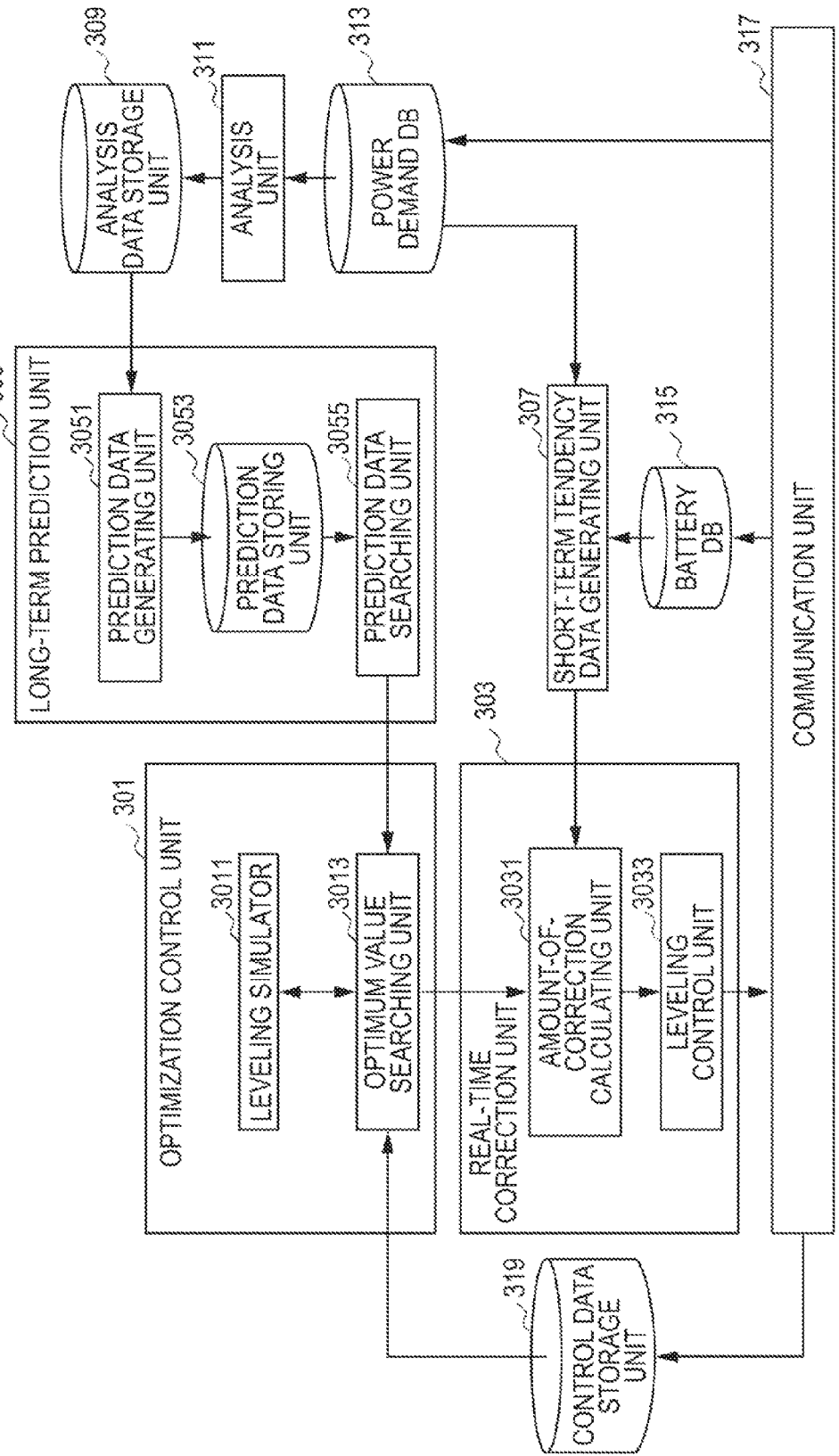
FIG. 2 is a functional block diagram of a power management server.

FIG. 2 is a functional block diagram of the power management server 3. The power management server 3 includes an optimization control unit 301, a real-time correction unit 303, a long-term prediction unit 305, a short-term tendency data generating unit 307, an analysis data storage unit 309, an analysis unit 311, a power demand DB 313, a battery DB 315, a communication unit 317, and a control data storage unit 319.

The optimization control unit 301 includes a leveling simulator 3011, and an optimum value searching unit 3013.

The real-time correction unit 303 includes an amount-of-correction calculating unit 3031, and a leveling control unit 3033.

A long-term prediction unit 305 includes a prediction data generating unit 3051, a prediction data storing unit 3053, and a prediction data searching unit 3055.

The communication unit 317 receives data on a remaining battery level from the power supplying unit 5 and stores it in the battery DB 315. The communication unit 317 receives data on a measured power demand from the measuring apparatus 7 and stores it in the power demand DB 313. The analysis unit 311 performs processing on data stored in the power demand DB 313, including calculating a mean value in a unit period of time such as 30 minutes and stores the result in the analysis data storage unit 309. The prediction data generating unit 3051 uses data stored in the analysis data storage unit 309 to generate prediction data on a power demand for each characteristic such as the day of the week and an event of a day when a power demand is measured, for example, and stores it in the prediction data storing unit 3053. The prediction data searching unit 3055 extracts the prediction data corresponding to the characteristic of the day when processing of this embodiment is performed (hereinafter, called a control target day) from the prediction data storing unit 3053 and notifies it to the optimum value searching unit 3013. The short-term tendency data generating unit 307 performs processing of generating data on a short-term tendency of a power demand and remaining battery level and notifies them to the amount-of-correction calculating unit 3031.

The communication unit 317 receives data on a characteristic of a control target day and data on a battery specification from the management terminal 13 and stores it to control data storage unit 319. The optimum value searching unit 3013 performs processing of searching a leveling desirable value on the basis of data stored in the control data storage unit 319 and data notified from the prediction data searching unit 3055. The leveling simulator 3011 performs a leveling simulation, which will be described later. The amount-of-correction calculating unit 3031 performs real time correction processing, which will be described later, on the basis of the data notified from the optimum value searching unit 3013 and short-term tendency data generating unit 307 and notifies the processing result to the leveling control unit 3033. The leveling control unit 3033 generates a control request including data on a corrected leveling desirable value and instructs the communication unit 317 to transmit the control request. The communication unit 317 transmits the control request to the power supplying unit 5.

FIG. 3 illustrates an example of data stored in the battery DB 315. The example in FIG. 3 includes a date and time column and an amount of electric energy column.

FIG. 4 illustrates an example of data stored in the power demand DB 313. The example in FIG. 4 includes a date and time column and a power column.

FIG. 5 illustrates an example of data stored in the analysis data storage unit 309. The example in FIG. 5 includes a date and time column and a power column. In the example in FIG. 5, data on a power demand every 30 minutes are stored.

FIG. 6 illustrates an example of data stored in the prediction data storing unit 3053. The example in FIG. 6 includes a characteristic column, a date and time column, and a power column. The prediction data may be generated by, for example, averaging the data of power demands on the days having a common characteristic. While data on the day of the week is stored as the characteristic data in the example in FIG. 6, the data may be data on a month or an event or the combination of them, for example. The characteristic data may be extracted from an intra-company scheduler, for example.

Figure 7:
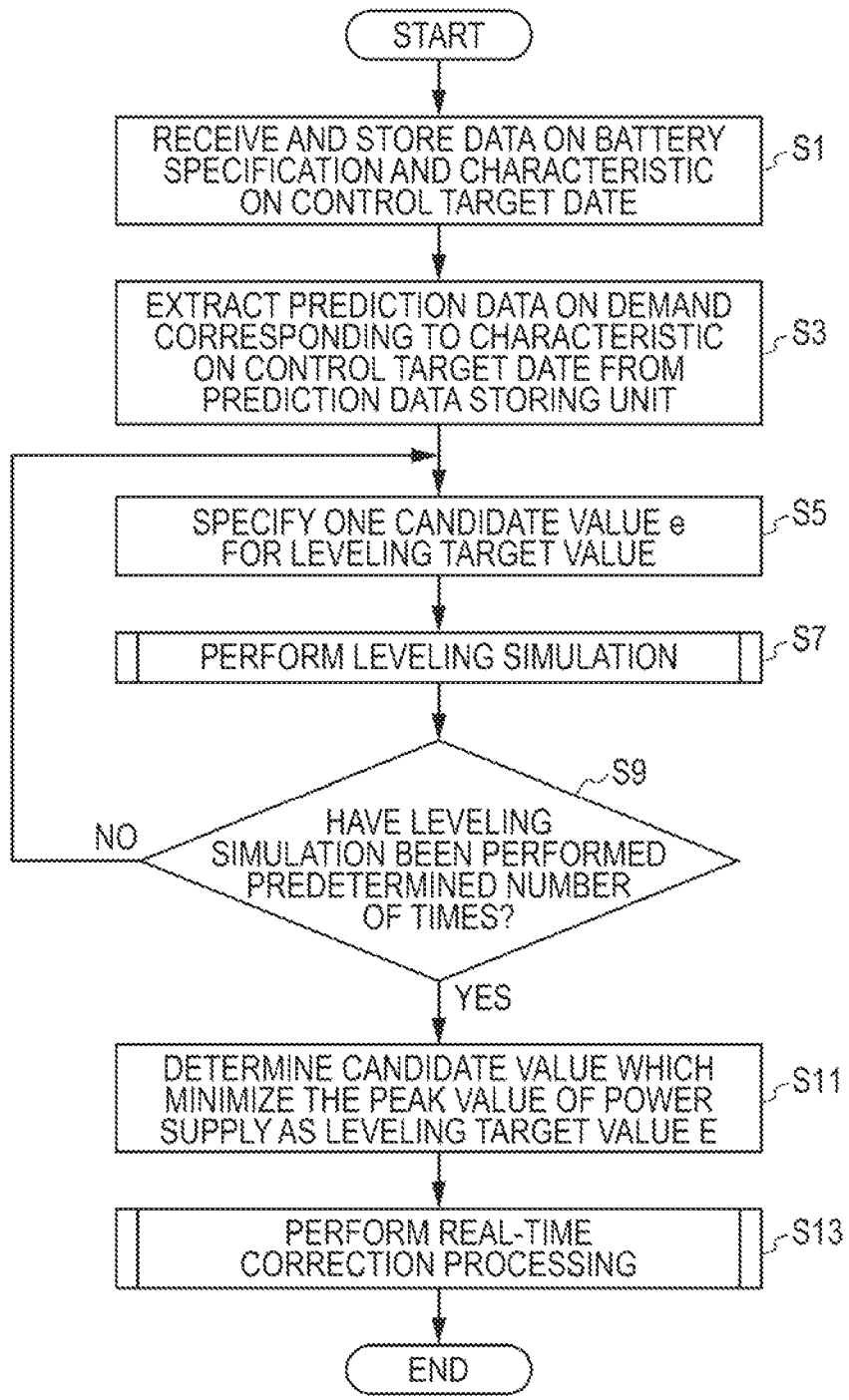
FIG. 7 illustrates a main processing flow according to this embodiment.

Next, with reference to FIG. 7 to FIG. 15, the details of the processing by the system illustrated in FIG. 1 will be described. First of all, the management terminal 13 receives from a manager the input of data on a characteristic on a control target day (such as the day of the week, a month, and a scheduled event) and data on a battery specification (such as a capacity, initial remaining level, and a maximum value of charge and discharge power of a battery). Then, the management terminal 13 transmits a desirable value setting request including the data on a characteristic on the control target day and data on a battery specification to the power management server 3. The communication unit 317 in the power management server 3 receives the desirable value setting request from the management terminal 13 and stores it in the control data storage unit 319 (FIG. 7, step S1).

The optimum value searching unit 3013 requests the prediction data searching unit 3055 to extract prediction data on the power demand corresponding to the control target day. The prediction data searching unit 3055 extracts the prediction data on the power demand corresponding to the control target day from the prediction data storing unit 3053 and outputs it to the optimum value searching unit 3013 (step S3).

The optimum value searching unit 3013 specifies one candidate value e for the leveling desirable value (step S5). In order to specify a candidate value e for the leveling desirable value, a metaheuristic method such as PSO (Particle Swarm Optimization) and GA (Genetic Algorithm) may be used, for example. The methods will not be described in detail since they are not a main part of this embodiment. In step S5, the optimum value searching unit 3013 outputs candidate value e, data stored in the control data storage unit 319 and prediction data on a power demand corresponding to the control target day to the leveling simulator 3011.

Next, the leveling simulator 3011 performs a leveling simulation (step S7). The leveling simulation will be described with reference to FIG. 8A to FIG. 12. The leveling simulator 3011 includes a power prediction unit for predicting, for each of a plurality of candidate values for a leveling target value, power to be supplied from a commercial power supply and a selection unit for selecting one of the candidate values as the leveling target value, as explained below. Further, the leveling simulator 3011 includes a charge and discharge calculation unit for calculating, for each of the plurality of candidate values, charge and discharge amounts of the battery, and a battery level prediction unit for predicting a remaining battery level, as explained below.

The leveling simulation according to this embodiment calculates the peak value of the power supplied from a commercial power supply for each candidate value. First of all, with reference to FIG. 8A to FIG. 10, there will be described the relationship among the magnitude of a candidate value e, the prediction value for the remaining battery level and the prediction value of power supplied from a commercial power supply. In FIG. 8A to FIG. 10C, the vertical axis on the left side indicates the power [kW], and the vertical axis on the right side and horizontal axis indicate the remaining battery level [%] and the time, respectively.

Figure 8A:
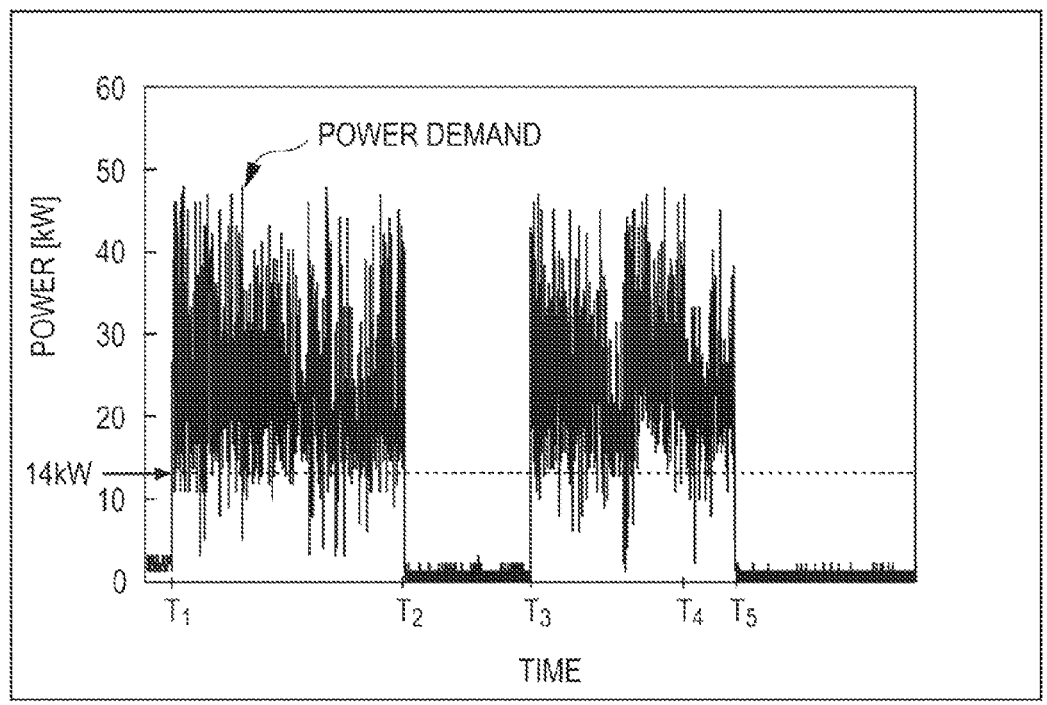
FIGS. 8A to 8C are diagrams for explaining relationship between a leveling desirable value and a remaining battery level.
Figure 8B:
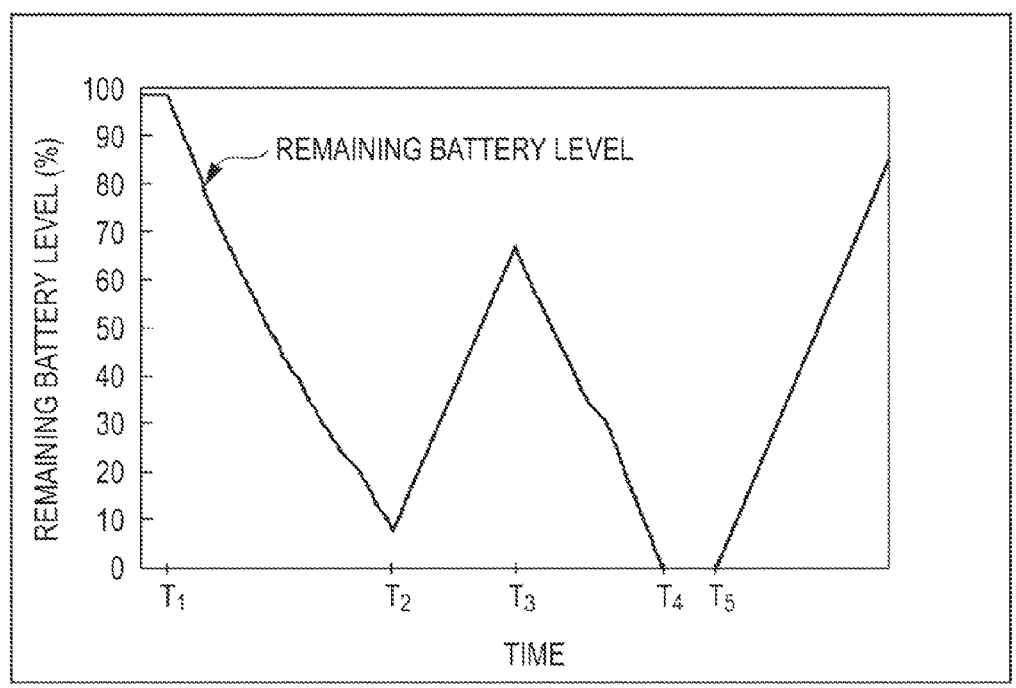
Figure 8C:
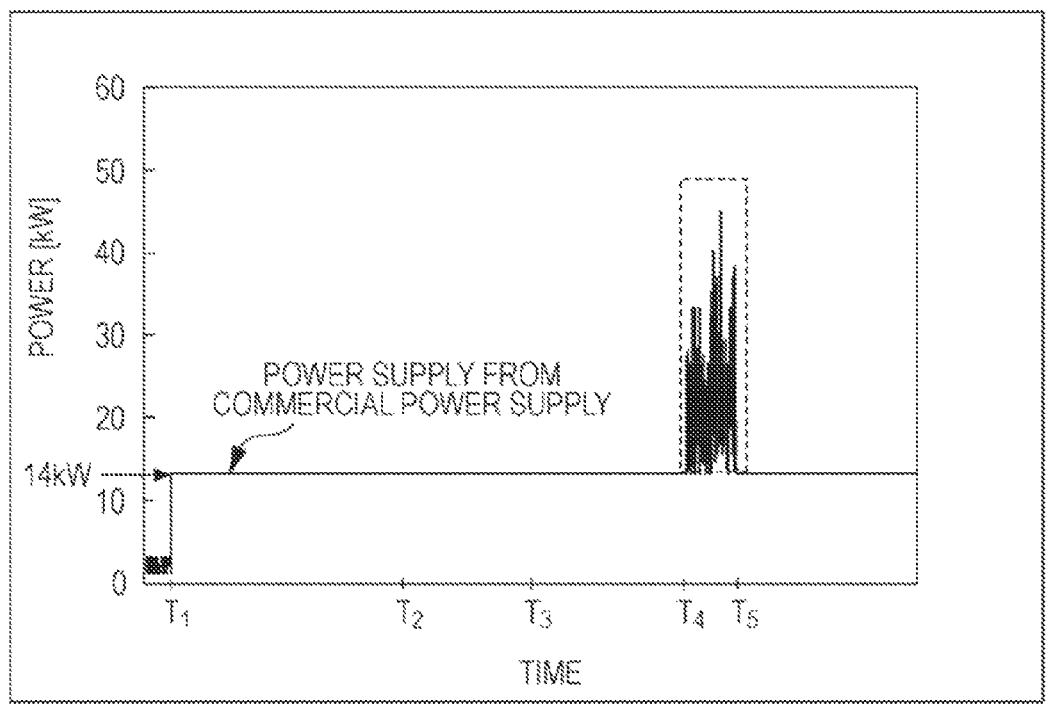

FIGS. 8A to 8C illustrate a case where the candidate value e is set to 14 kW. In the example in FIGS. 8A to 8C, the power demand increases at a time T1. When the power demand exceeds the leveling desirable value (14 kW) (FIG. 8A), the battery is started to discharge. Then, the remaining battery level decreases (FIG. 8B). After that, until a time T2, the remaining battery level keeps decreasing (FIG. 8B). When the power demand falls to below the leveling desirable value at the time T2 (FIG. 8A), the battery is started to charge. Then, the remaining battery level increases (FIG. 8B). After that, until a time T3, the remaining battery level keeps increasing (FIG. 8B). When the power demand increases and exceeds the leveling desirable value at the time T3 (FIG. 8A), the battery is started to discharge. Then, the remaining battery level decreases again (FIG. 8B). When the remaining battery level reaches 0% at a time T4 (FIG. 8B), the power supplied from the commercial power supply rapidly increases (the part enclosed by the dashed line in FIG. 8C). This is because the power demand is only met by the supplied power from the commercial power supply. At a time T5 after that, the power demand falls to below the leveling desirable value (FIG. 8A), the power supplied from the commercial power supply returns to the leveling desirable value (FIG. 8C). Then, the battery is started to charge (FIG. 8B).

Figure 9A:
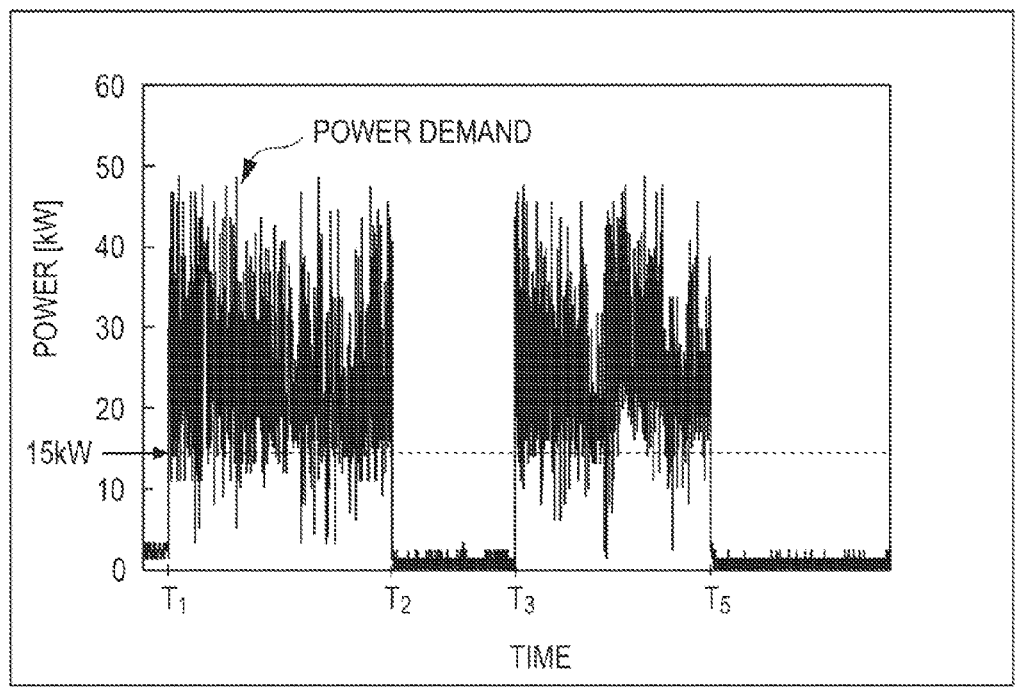
FIGS. 9A to 9C are diagrams for explaining relationship between a leveling desirable value and a remaining battery level.
Figure 9B:
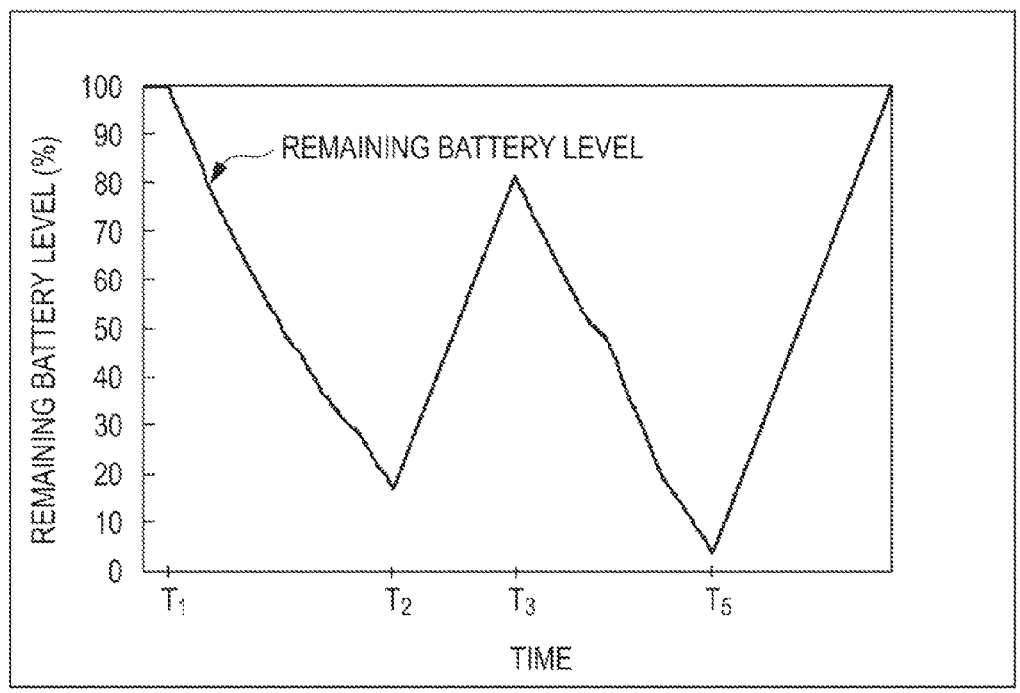
Figure 9C:
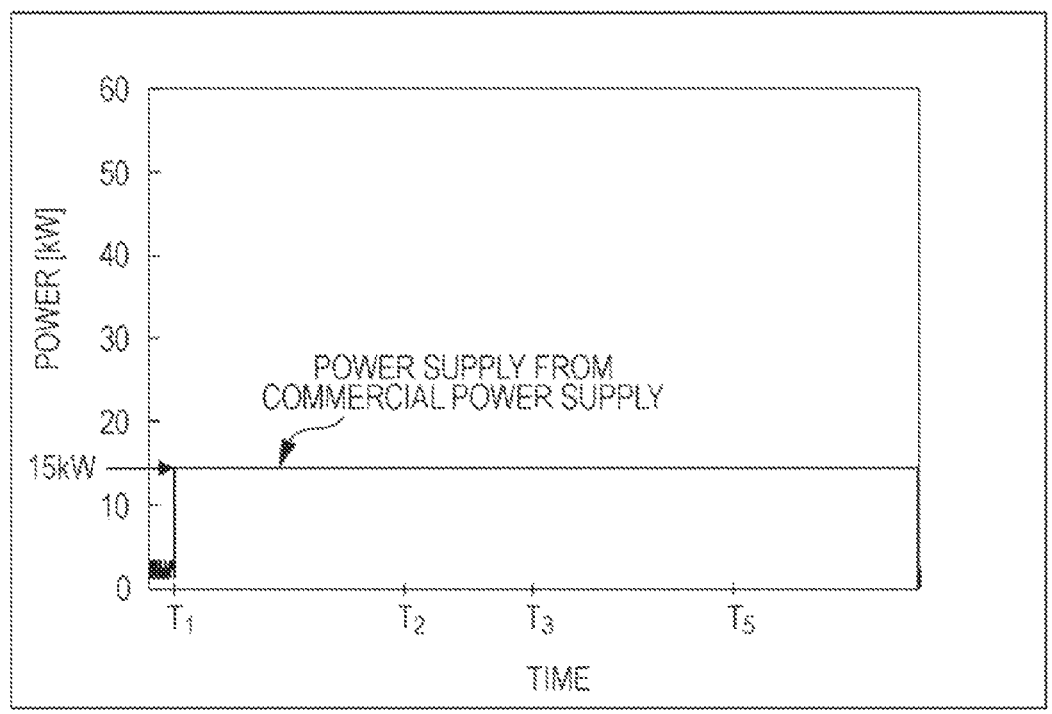

On the other hand, FIGS. 9A to 9C illustrate a case where the candidate value e is set to 15 kW. In the example in FIGS. 9A to 9C, the remaining battery level has a similar transition to that in FIGS. 8A to 8C, but the remaining battery level does not reach 0% (FIG. 9B). This is because a less amount of power is required to discharge from the battery since the candidate value e is set to a higher value than that in the example in FIGS. 8A to 8C. This can prevent the rapid increase of power to be supplied from a commercial power supply as in the example in FIGS. 8A to 8C (FIG. 9C).

Figure 10A:
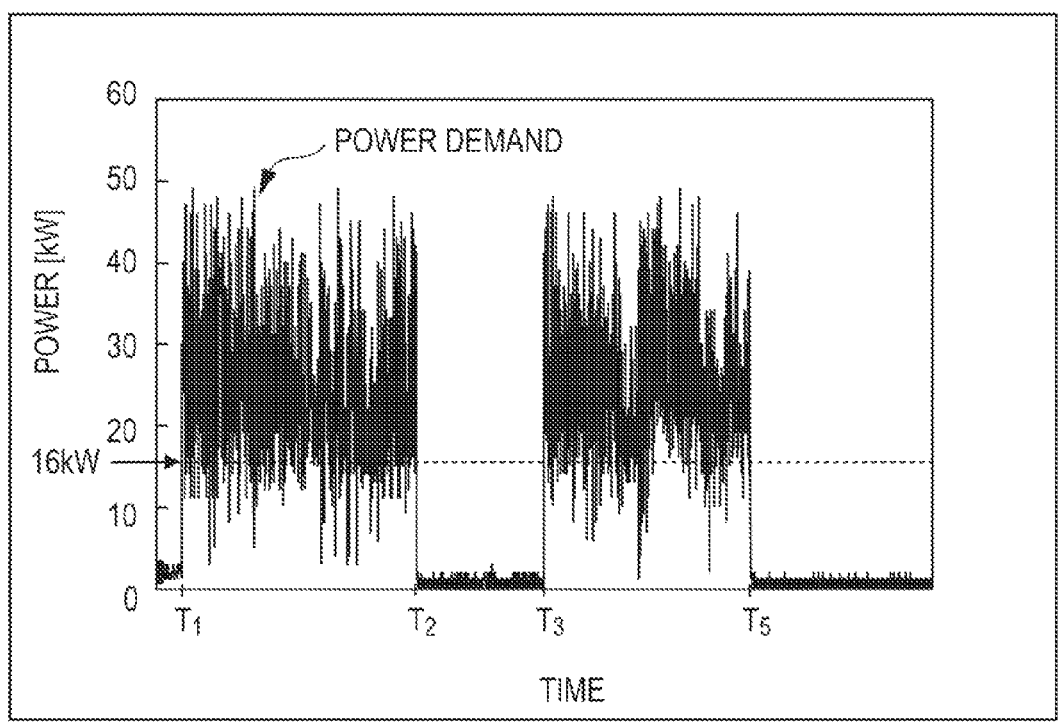
FIGS. 10A to 10C are diagrams for explaining relationship between a leveling desirable value and a remaining battery level.
Figure 10B:
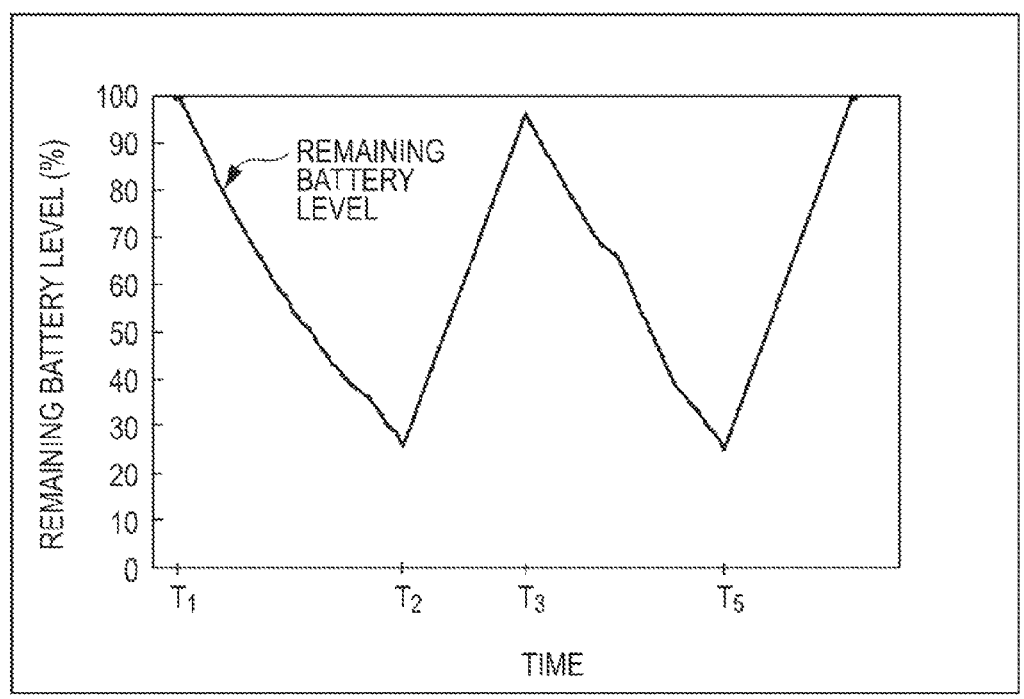
Figure 10C:
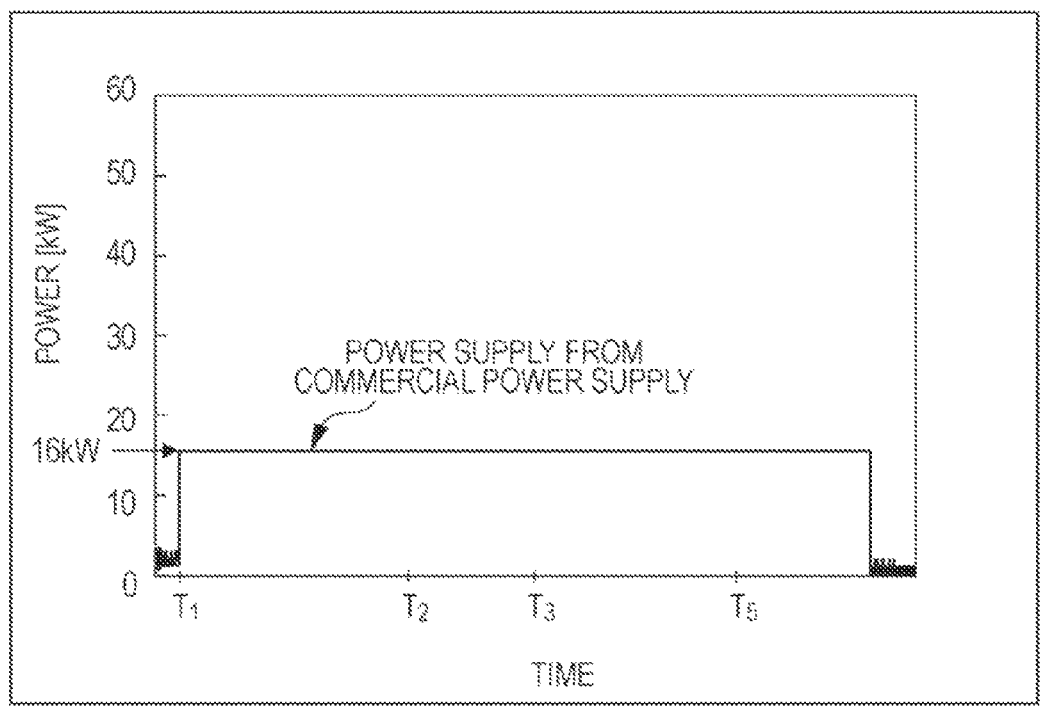

FIGS. 10A to 10C illustrate a case where the candidate value e is set to 16 kW. Also in the example in FIGS. 10A to 10C, like the example in FIGS. 9A to 9C, because the candidate value e is set to a higher value than that in the example in FIGS. 8A to 8C, the power supplied from a commercial power supply does not rapidly increase (FIG. 10C). However, in the example in FIGS. 10A to 10C, the battery still has a remaining battery level of about 25% even at the times T2 and T5 with the shortest remaining battery level (FIG. 10B), and the battery may not be used as effectively as in the example in FIGS. 9A to 9C.

Figure 11:
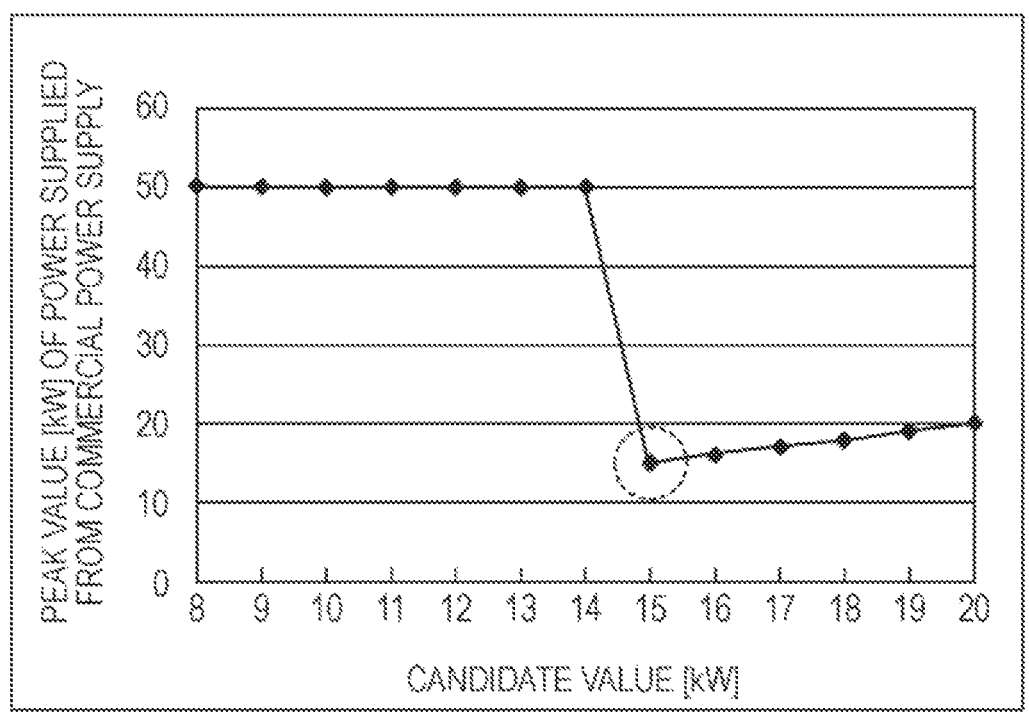
FIG. 11 is diagrams for explaining relationship between a leveling desirable value and the peak valve of supplied power.

FIG. 11 illustrates a relationship between a peak value of power supplied from a commercial power supply and a candidate value. In FIG. 11, the vertical axis indicates peak value [kW] of the power supplied from a commercial power supply, and the horizontal axis indicates candidate value [kW]. In the example in FIG. 11, when the candidate value is equal to or lower than 14 kW, the remaining battery level reaches 0. Thus, the power supplied from a commercial power supply increases significantly. On the other hand, when the leveling desirable value is equal to or higher than 15 kW, the remaining battery level does not reach 0%. The peak value of the power supplied from a commercial power supply then is equal to the leveling desirable value. In this case, the optimum value as the leveling desirable value is equal to 15 kW. In other words, according to this embodiment, a leveling simulation is performed for each candidate value, and the peak value of the power supplied from a commercial power supply is calculated. Then, the candidate value with a minimum peak value is specified as the leveling desirable value.

Figure 12:
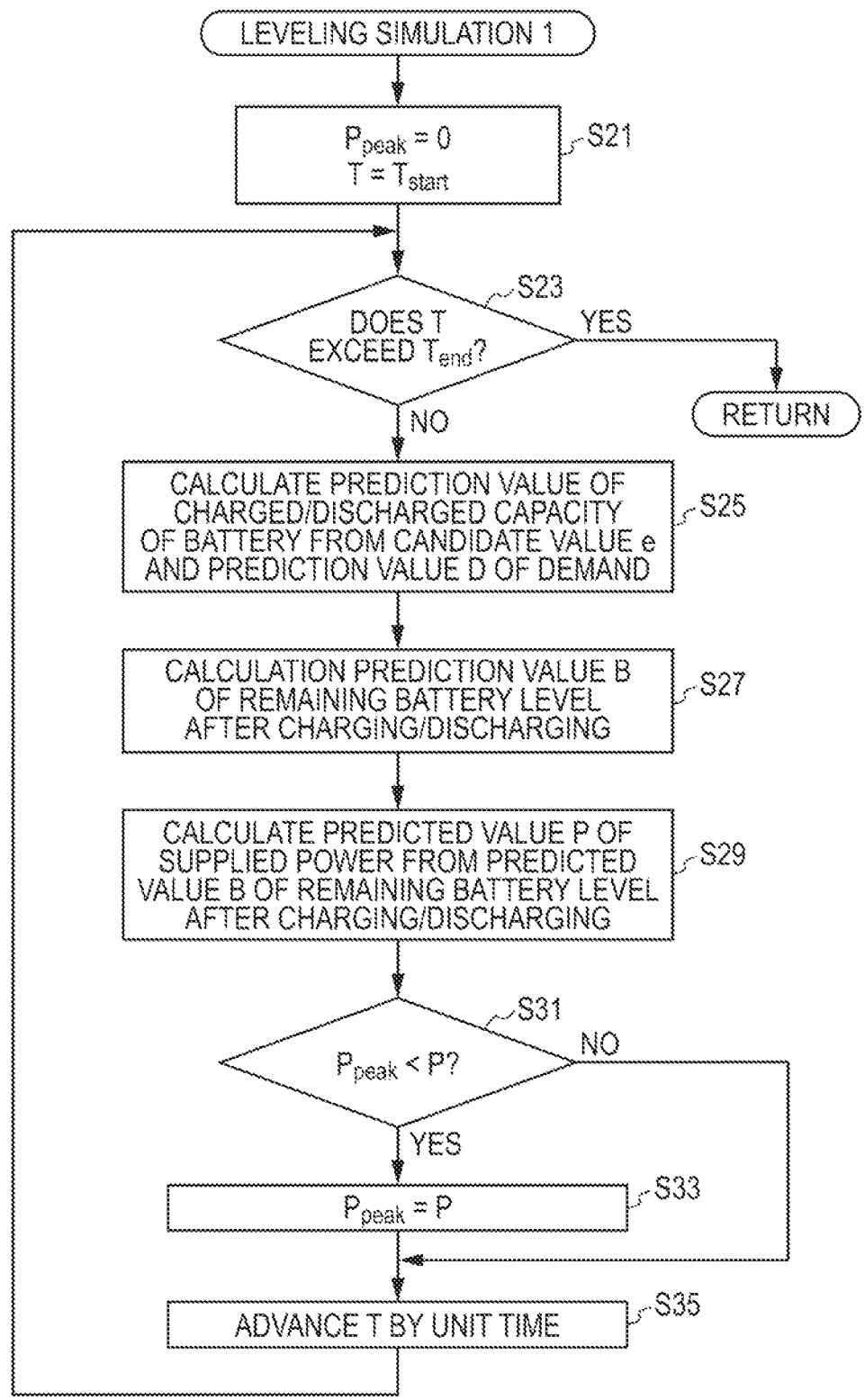
FIG. 12 illustrates a processing flow of a first leveling simulation.

Next, with reference to FIG. 12, details of processing in the leveling simulation will be described. First of all, the leveling simulator 3011 sets Ppeak=0 and T=Tstart as the initial values (step S21). Ppeak is the peak value of the power supplied from a commercial power supply. Tstart is the beginning time of the period for calculation.

The leveling simulator 3011 then determines whether T has overrun Tend or not (step S23). Tend is the end time of the period for calculation. If it is determined that T has overrun Tend (Yes in step S23), the end of the calculation can be determined. Thus, the leveling simulator 3011 notifies the calculation result (the peak value of the power supplied from a commercial power supply) to the optimum value searching unit 3013. Then, the processing returns to the beginning.

On the other hand, if it is determined that T has not exceeded Tend (No in step S23), the leveling simulator 3011 uses a candidate value e and predicted power demand value D to calculate a prediction value of the charge/discharge amount for the battery and stores it in a storage such as a main memory (step S25). For example, the relationship between D and e may be used for the calculation. If it is D<e, charging may be performed. If it is D>e, discharging may be performed. If the data on the battery specification received in step S1 includes data on a maximum charge power and a maximum discharge power, the charge/discharge amount not exceeding those values are calculated.

Next, the leveling simulator 3011 uses a prediction value of the battery charge/discharge amount to calculate the prediction value of the remaining battery level B after charging/discharging and stores it in a storage such as a main memory (step S27). For example, B=Bpre−(the prediction value of the charge/discharge amount) may be used for the calculation. Bpre is the battery level before the predicted charging/discharging is performed. If the data on the remaining battery level received in step S1 includes data on the capacity or initial remaining level of the battery, the value may be used.

The leveling simulator 3011 calculates the prediction value P of the supplied power from the prediction value B of the remaining battery level after charging/discharging and stores it in a storage such as a main memory (step S29). For example, if it is B=0, the power demand is met only with the supplied power from a commercial power supply. Thus, the prediction value P of the supplied power is equal to the prediction value D of the power demand. On the other hand, if it is B≠0, the prediction value P of the supplied power is equal to the prediction value D of the power demand when the prediction value D of the power demand has not reached the candidate value e yet. The prediction value P of the supplied power is equal to the candidate value e if the prediction value D of the power demand has already reached the candidate value e.

The leveling simulator 3011 then determines whether it is Ppeak<P or not (step S31). If it is not Ppeak<P (No in step S31), the processing moves to step S35.

On the other hand, if it is Ppeak<P (Yes in step S31), the leveling simulator 3011 sets Ppeak=P (step S33). The leveling simulator 3011 then advances T by a unit time (step S35), and the processing moves to step S23.

Performing the processing as described above allows the specification of the leveling desirable value from the viewpoint of minimization of the peak value of the power supplied from a commercial power supply.

Referring back to FIG. 7, the optimum value searching unit 3013 determines whether the leveling simulation has performed a predetermined number of times or not (step S9). If not (No in step S9), the processing returns to step S5 to process the next candidate value. If so on the other hand (Yes in step S9), the optimum value searching unit 3013 specifies the candidate value which provides a minimum peak value of the power supplied from a commercial power supply as a leveling desirable value E (step S11). In step S11, the optimum value searching unit 3013 notifies the power demand prediction data and the specified leveling desirable value E to the amount-of-correction calculating unit 3031.

Next, the amount-of-correction calculating unit 3031 performs real time correction processing (step S13). The real time correction processing will be described with reference to FIG. 13 to FIG. 15. The amount-of-correction calculating unit 3031 includes a deviation calculation unit for calculating a deviation amount between an actual power demand and a predicted power demand and a correction unit for correcting a leveling target value, as explained below.

Figure 13:
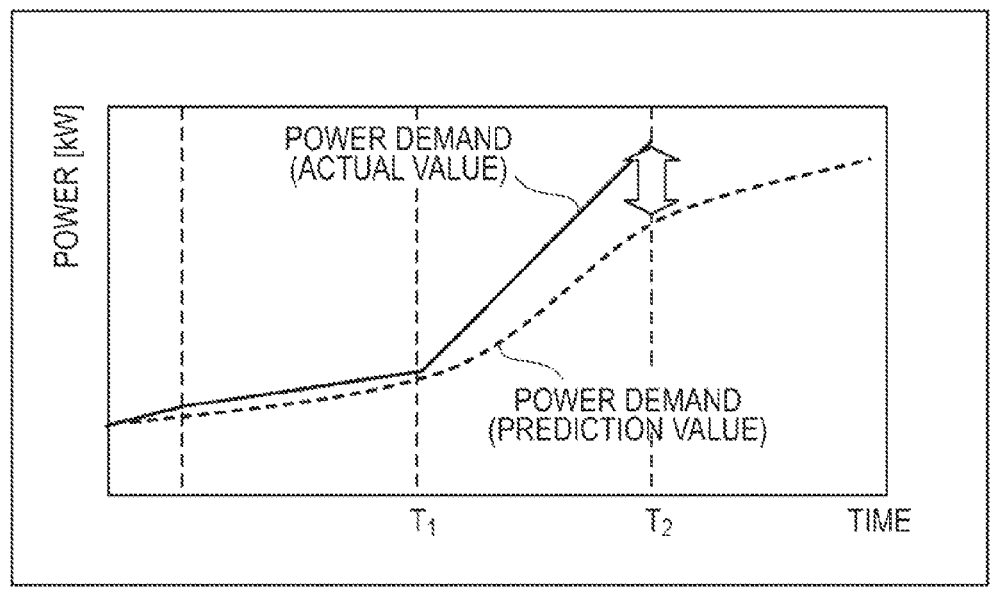
FIG. 13 is a diagram for explaining the deviation between an actual power demand and a predicted power demand.

FIG. 13 illustrates the transition of a measured power demand and a predicted power demand. The vertical axis of FIG. 13 indicates power [kW], and the horizontal axis indicates time. It is assumed that the real time correction processing is performed at a time T2. In the example in FIG. 13, the measured power demand shifts without largely deviating from the prediction until the time T1. From the time T1 to the time T2, the deviation gradually increases, and the deviation is significantly large at the time T2. Keeping this state may significantly raise the peak value of the power supplied from a commercial power supply since the discharged power from the battery is larger than predicted and the remaining battery level may reach 0%.

Figure 14:
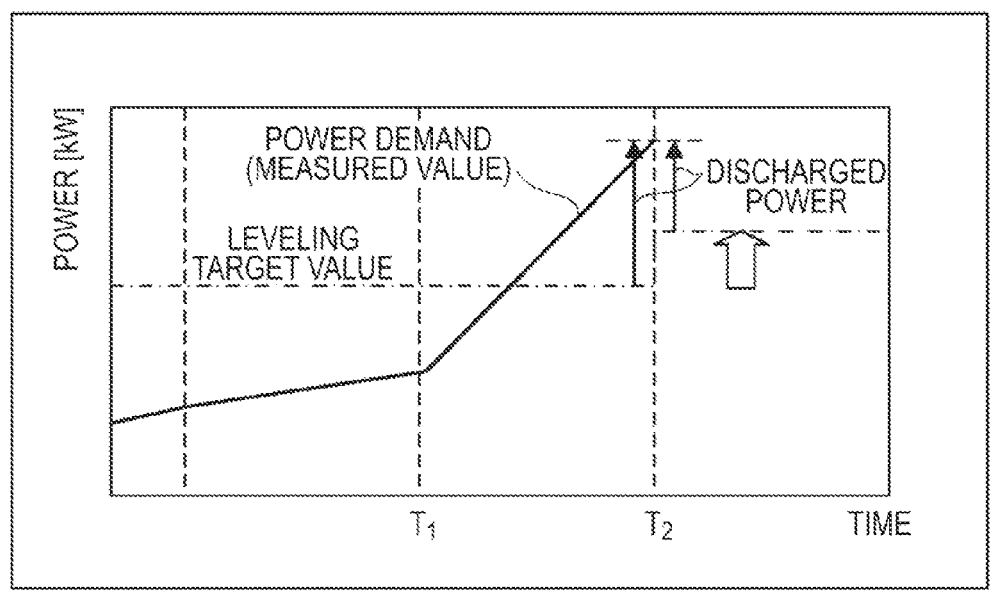
FIG. 14 is a diagram for explaining how a leveling desirable value is corrected.

Accordingly, the real time correction processing according to this embodiment corrects the leveling desirable value. FIG. 14 illustrates the case where the leveling desirable value is set to a higher value. The vertical axis indicates power [kW], and the horizontal axis indicates time. In the example in FIG. 14, the leveling desirable value is corrected at the time T2. Thus, the discharged power from the battery decreases. According to this embodiment, the real time correction processing is performed every lapse of a unit period of time (such as 30 minutes) so that the peak value of the power supplied from a commercial power supply can be prevented from being significantly high, as will be described below.

Figure 15:
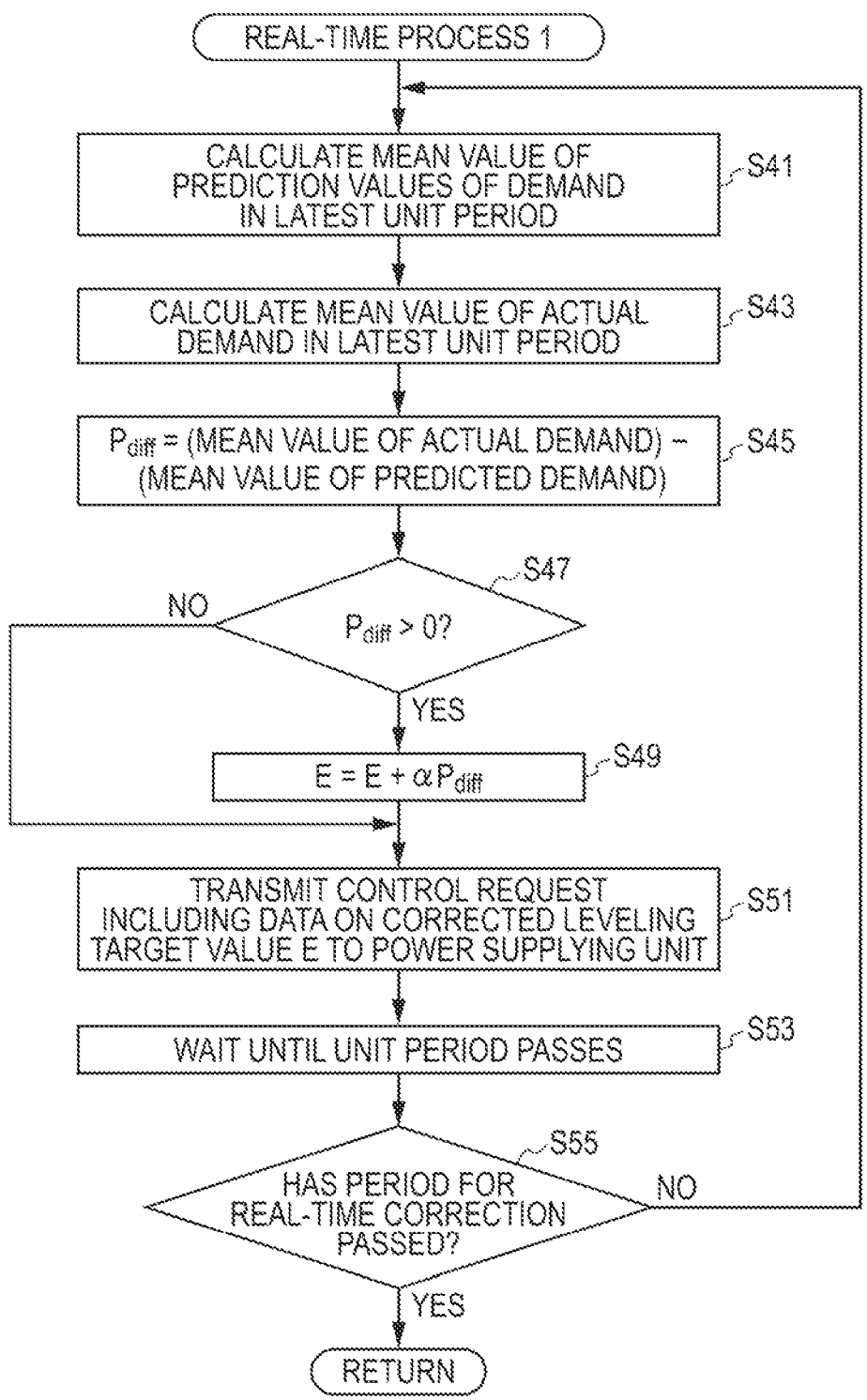
FIG. 15 illustrates a processing flow of a first real time correction processing.

Next, with reference to FIG. 15, details of the real time correction processing will be described. First of all, the amount-of-correction calculating unit 3031 calculates the mean value of the power demand prediction values for the last unit period on the basis of power demand prediction data and stores it in a storage such as a main memory (FIG. 15, step S41). For example, if the power demand prediction data are for every 30 minutes as illustrated in FIG. 6 and the last unit period is the 30 minutes from 11:00 to 11:30, the mean value between the power demand prediction value at 11:00 and the power demand prediction value at 11:30 is calculated.

Next, the amount-of-correction calculating unit 3031 instructs the short-term tendency data generating unit 307 to generate data on a short-term tendency of actual power demands. The short-term tendency data generating unit 307 extracts data on power demands in the last unit period from the power demand DB 313, calculates the mean value of the power demands in the last unit period, and notifies it to the amount-of-correction calculating unit 3031 (step S43).

The amount-of-correction calculating unit 3031 subtracts the mean value of the predicted power demands calculated in step S41 from the mean value of the actual power demands calculated in step S43 to calculate a Pdiff and stores it in a storage such as a main memory (step S45).

The amount-of-correction calculating unit 3031 then determines whether it is Pdiff>0 or not (step S47). If it is not Pdiff>0 (No in step S47), the processing moves to step S51. In step S47, whether Pdiff is higher than 0 or not is determined, but whether Pdiff is higher than a predetermined threshold value or not may be determined.

On the other hand, if it is determined that it is Pdiff>0 (Yes in step S47), the amount-of-correction calculating unit 3031 calculates a leveling desirable value E=Epres+α×Pdiff and stores it in a storage such as a main memory (step S49). Epres is the leveling desirable value before correction. α is the amount of correction for Pdiff. For example, if α is equal to 0, the leveling desirable value E is not corrected. If α=1, E is corrected to compensate the entire power shortage.

Next, the amount-of-correction calculating unit 3031 notifies the leveling desirable value E after the correction to the leveling control unit 3033. The leveling control unit 3033 generates a control request including data on the leveling desirable value E after the correction and transmits it to the power supplying unit 5 (step S51).

The processing to be performed in the power supplying unit 5 will be described below. The communication unit 501 in the power supplying unit 5 receives the control request from the power management server 3 and stores it in a storage such as a main memory. The communication unit 501 notifies the data on the leveling desirable value E included in the control request to the power operation unit 503. The power operation unit 503 compares the actual power demand notified from the power demand monitoring unit 511 and the leveling desirable value E and determines whether charging or discharging is performed. Here, since the actual power demand is higher than the leveling desirable value E, the battery 505 is discharged. The power operation unit 503 instructs the discharging control unit 509 to control the discharging from the battery 505 and power supplied from the commercial power supply 9. The discharging control unit 509 controls the commercial power supply 9 so as to supply power that is equivalent to the leveling desirable value E and controls the battery 505 so as to discharge the power shortage.

Referring back to FIG. 15, the amount-of-correction calculating unit 3031 waits until a unit period passes (step S53). After a lapse of the unit period, whether the period in which the real time correction is to be performed (such as one day) has passed or not is determined (step S55). If not (No in step S55), the processing returns to step S41 to perform the process in the next unit period. If so on the other hand (Yes in step S55), the processing returns to the beginning and ends.

Performing the processing as described above can prevent significant increase of the peak value of the power supplied from a commercial power supply even when the actual power demand is greatly deviated from the predicted power demand.

Second Embodiment

Next, a second embodiment will be described. According to the aforementioned first embodiment, the leveling desirable value is specified such that the peak value of the power supplied from a commercial power supply can be a minimum. According to the second embodiment on the other hand, the leveling desirable value is specified such that not only the peak value of the power supplied from a commercial power supply but also the amount of carbon dioxide exhausted by electric power generation can be reduced.

Since the configuration diagram of the system according to this embodiment and the function block diagram of the power management server 3 are the same as those described according to the first embodiment, the description will be omitted.

Figure 16:
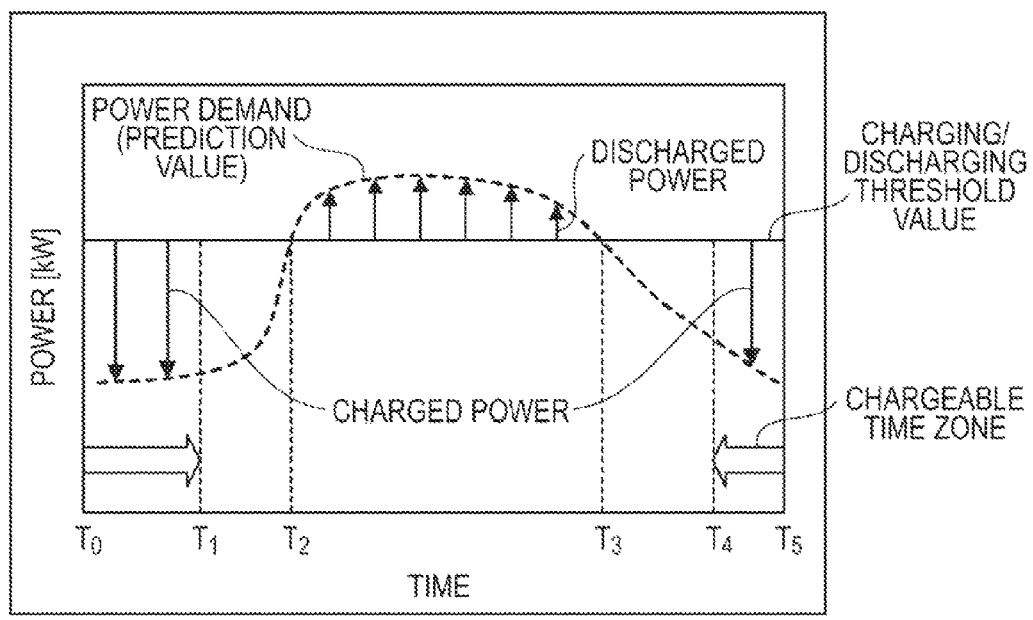
FIG. 16 is a diagram for explaining the limitation on a time zone for charging.
Figure 17:
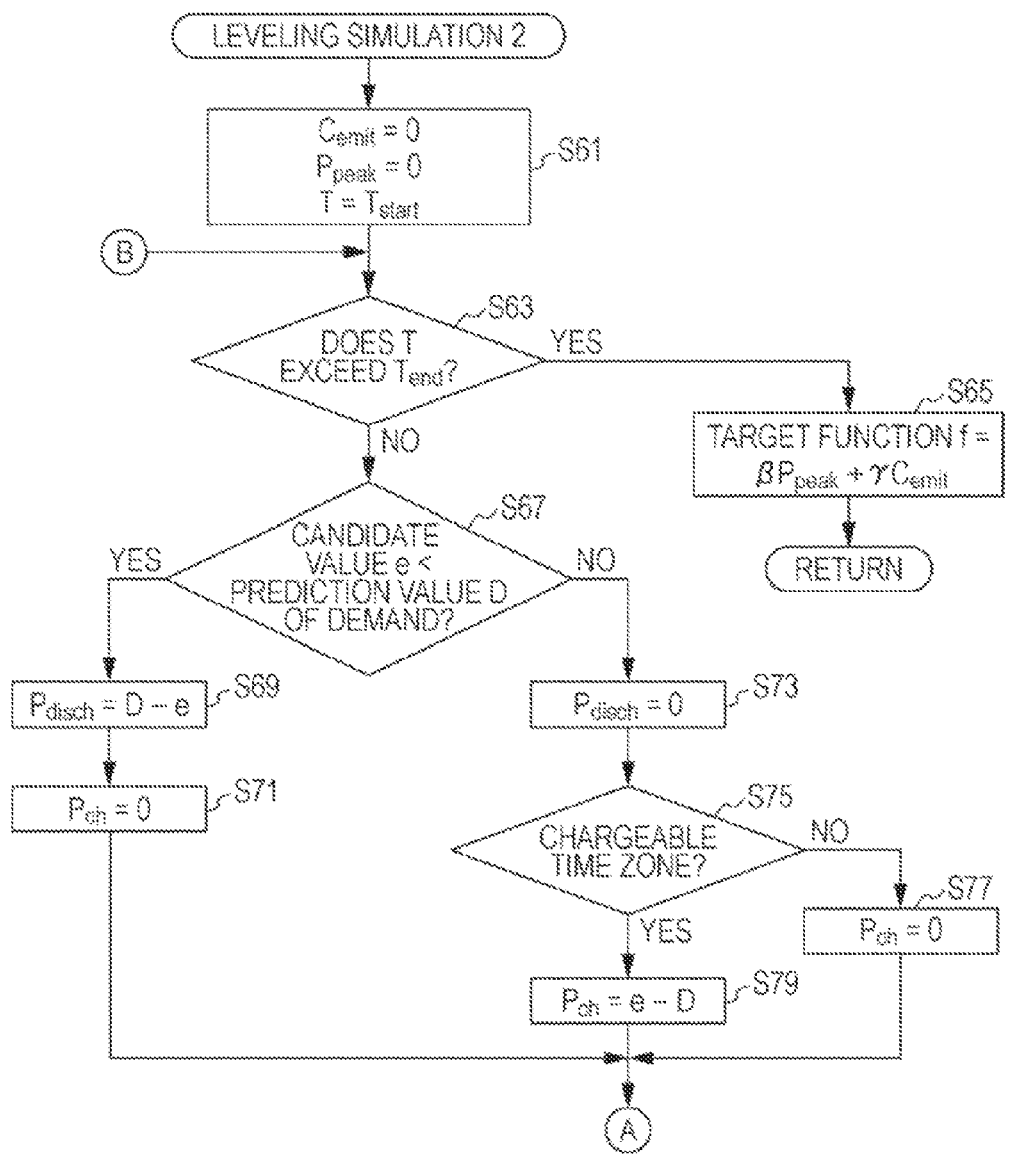
FIG. 17 illustrates a processing flow of a second leveling simulation.

Next, with reference to FIG. 16 to FIG. 18, a leveling simulation (step S7) according to this embodiment will be described. First of all, with reference to FIG. 16, the concept of a leveling simulation according to this embodiment will be described. In FIG. 16, the vertical axis indicates power [kW], and the horizontal axis indicates time. In the example in FIG. 16, the nighttime (such as 23:00 to 7:00 in the next morning) from a time T0 to a time T1 and from a time T4 to a time T5 is handled as a chargeable time zone. In the example in FIG. 16, charging is performed from the time T0 to the time T1 and from the time T4 to the time T5. Charging and discharging are not performed from the time T1 to the time T2 and from the time T3 to the time T4. Discharging is performed from the time T2 to the time T3.

In this way, generating the relatively larger proportion of the amount of electricity during a time zone such as the nighttime with a less amount of carbon dioxide exhausted by generation of a unit amount of electricity can reduce the exhausted amount of carbon dioxide as a whole. According to Kajiyama et al., "Raihusaikuru Kara Mita Chikudenchi No Denryokuhu Kaheijyunka Niyoru Enerugi/Kankyou Kaizen Kouka (Energy and environmental analysis of batteries for electric load leveling using LCA method)", Journal of Life Cycle Assessment, Vol. 2 No. 4, October 2006), the amount of carbon dioxide exhausted when energy of 1 kWh is generated is 514 g during the daytime (from 8:00 to 23:00) and 391 g during the nighttime (from 23:00 to the next 8:00). This is because, during the nighttime, the proportion of energy generated by thermal power generation is lower, and the proportion of the energy generated by nuclear electric power generation is higher, for example.

Next, with reference to FIG. 17 and FIG. 18, details of a leveling simulation according to this embodiment will be described. The leveling simulator 3011 includes an exhaustion calculation unit for calculating, for each of a plurality of candidate values for a leveling target value, an exhausted amount of carbon dioxide in addition to a power prediction unit and a selection unit disclosed in the aforementioned first embodiment.

First of all, the leveling simulator 3011 sets Cemit=0, Ppeak=0 and T=Tstart as the initial values (step S61). Cemit is the amount of carbon dioxide exhausted by electric power generation. Ppeak is the peak value of the power supplied from a commercial power supply. Tstart is the beginning time of the period for calculation.

The leveling simulator 3011 determines whether T has overrun Tend or not (step S63). Tend is the end time of the period for calculation. If it is determined that T has overrun Tend (Yes in step S63), the leveling simulator 3011 calculates an objective function $f=\beta P peak+\gamma Cemit$ and stores it in a storage such as a main memory (step S65). $\beta$ and $\gamma$ are determined depending on which of the minimization of the peak value of the power supplied from a commercial power supply and the minimization of the exhaust amount of carbon dioxide has priority. If it is set as $\beta=1$ and $\gamma=0$, a candidate value which provides a minimum peak value of the power supplied from a commercial power supply is specified as a leveling desirable value, like the first embodiment. In step S65, the leveling simulator 3011 notifies the calculation result (objective function f) to the optimum value searching unit 3013 and returns to the beginning. In step S11, instead of the peak value Ppeak of the power supplied from a commercial power supply, a candidate value e which provides a minimum objective function f is specified as the leveling desirable value.

On the other hand, if it is determined that T has not overrun Tend (No in step S63), the leveling simulator 3011 determines whether it is candidate value e<power demand prediction value D or not (step S67).

If it is determined that candidate value e<power demand prediction value D (Yes in step S67), the leveling simulator 3011 calculates Pdisch=D−e and stores it in a storage such as a main memory (step S69). Pdisch is the amount of discharging from a battery. The leveling simulator 3011 sets Pch=0 and stores it in a storage such as a main memory (step S71). Pch is the amount of charging to the battery.

On the other hand, if it is not candidate value e<power demand prediction value D (No in step S67), the leveling simulator 3011 sets Pdisch=0 and stores it in a storage such as a main memory (step S73). The leveling simulator 3011 determines whether T is included in a chargeable time zone or not (step S75).

If it is determined that T is not included in the chargeable time zone (No in step S75), the leveling simulator 3011 sets Pch=0 and stores it in a storage such as a main memory (step S77).

On the other hand, if it is determined that T is included in the chargeable time zone (Yes in step S75), the leveling simulator 3011 sets Pch=e−D and stores it in a storage such as a main memory (step S79). The processing then moves to step 81 in FIG. 18 through a terminal A.

If the data on a battery specification received in step S1 includes data on a maximum charge power and a maximum discharge power, Pch and Pdisch are calculated such that they are under the maximum values.

Figure 18:
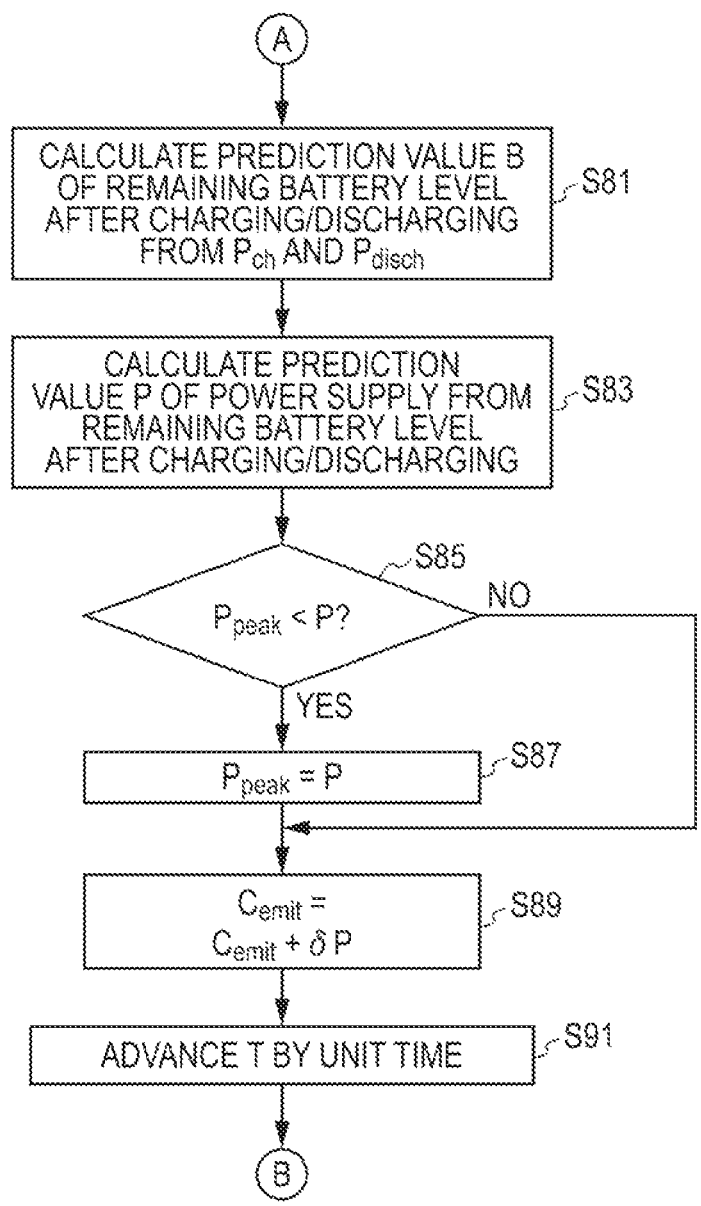
FIG. 18 illustrates the processing flow of the second leveling simulation.

With reference to FIG. 18, the processing after the terminal A will be described. First of all, the leveling simulator 3011 calculates a prediction value B of the remaining battery level after charging/discharging from Pch and Pdisch and stores it in a storage such as a main memory (step S81). For example, B=Bpre+Pch−Pdisch may be used for the calculation. Bpre is the battery level before the predicted charging/discharging is performed. If the data on the remaining battery level received in step S1 includes data on the capacity or initial remaining level of the battery, the value may be used for calculating B.

The leveling simulator 3011 calculates the prediction value P of the supplied power from the prediction value B of the remaining battery level after charging/discharging and stores it in a storage such as a main memory (step S83). For example, if it is B=0, the power demand is met only with the supplied power from a commercial power supply. Thus, the prediction value P of the supplied power is equal to the prediction value D of the power demand. On the other hand, if it is B≠0, the prediction value P of the supplied power is equal to the prediction value D of the power demand when the prediction value D of the power demand has not reached the candidate value e yet. The prediction value P of the supplied power is equal to the candidate value e if the prediction value D of the power demand has already reached the candidate value e.

The leveling simulator 3011 then determines whether it is Ppeak<P or not (step S85). If it is not Ppeak<P (No in step S85), the processing moves to step S89.

On the other hand, if it is Ppeak<P (Yes in step S85), the leveling simulator 3011 sets Ppeak=P and stores it in a storage such as a main memory (step S87). The leveling simulator 3011 sets Cemit=Cemit_pres+δP and stores it in a storage such as a main memory (step S89). Cemit_pres is the present amount of carbon dioxide exhausted by electric power generation. δ is the amount of carbon dioxide (g/kWh) exhausted when a unit amount of electricity is generated, and different values may be set in accordance with the time zones.

Next, the leveling simulator 3011 advances T by a unit time (step S91). The processing then returns to step S63 in FIG. 17 through a terminal B.

Performing the processing as described above allows the specification of the leveling desirable value from the viewpoint of minimization of the peak value of the power supplied from a commercial power supply and minimization of the exhausted amount of carbon dioxide.

Third Embodiment

Next, a third embodiment will be described. According to the aforementioned first embodiment, the deviation between an actual power demand and a predicted power demand is monitored, and the leveling desirable value is corrected in accordance with the degree of deviation. On the other hand, according to this embodiment, the deviation between an actual remaining battery level and a predicted remaining battery level, and the leveling desirable value is corrected in accordance with the degree of deviation.

Since the configuration diagram of the system according to this embodiment and the function block diagram of the power management server 3 are the same as those described according to the first embodiment, the description will be omitted.

Next, with reference to FIG. 19 to FIG. 21, real time correction processing according to this embodiment will be described. The amount-of-correction calculating unit 3031 includes a calculation unit for calculating a deviation amount between an actual remaining battery level and a predicted remaining battery level and a correction unit for correcting a leveling target value, as explained below. Further, the amount-of-correction calculating unit 3031 includes a battery level prediction unit for predicting a remaining battery level, as explained below.

First of all, with reference to FIG. 19 and FIG. 20, the concept of real time correction according to this embodiment will be described. In FIG. 19 and FIG. 20, the vertical axis on the left side indicates power [kW], and the vertical axis on the right side and the horizontal axis indicate remaining battery level [%] and time, respectively.

Figure 19:
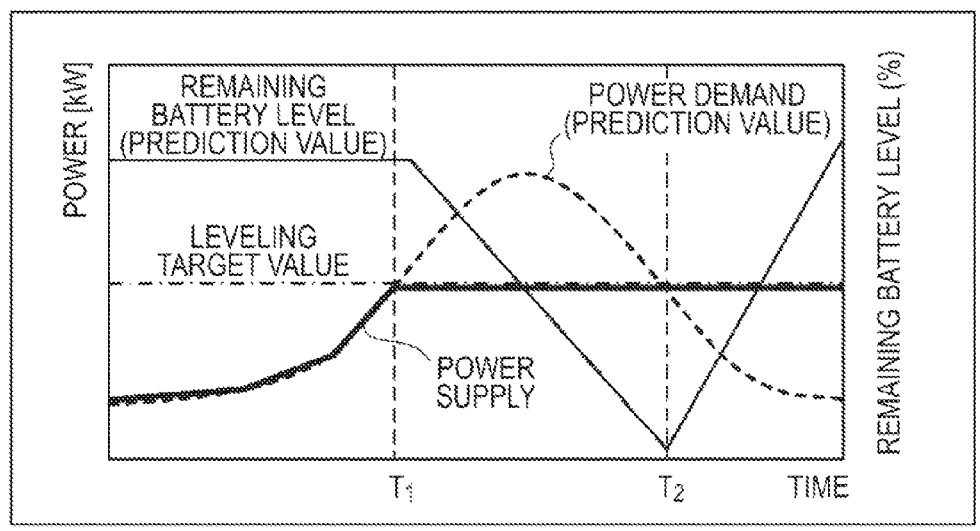
FIG. 19 is a diagram for explaining ideal transition of a remaining battery level.

In the example in FIG. 19, since the power demand is lower than a leveling desirable value until a time T1, the remaining battery level does not change. After that, when the power demand exceeds the leveling desirable value at the time T1, the battery is started to discharge. Thus, the remaining battery level starts decreasing. When the power demand falls to below the leveling desirable value at a time T2, the battery is started to charge. Thus, the remaining battery level starts increasing. In this way, if the power demand has a transition as predicted, the remaining battery level does not reach 0.

Figure 20:
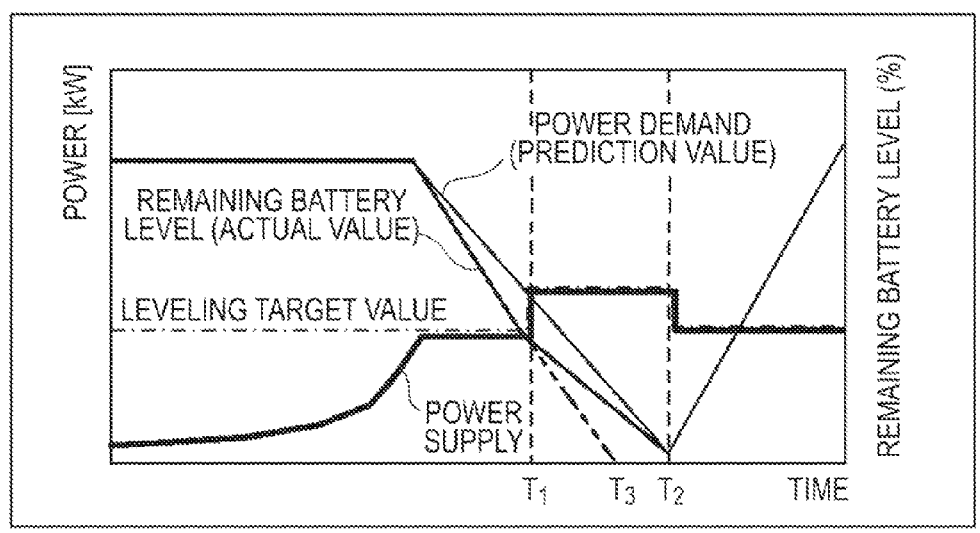
FIG. 20 is a diagram for explaining the deviation between an actual remaining battery level and a predicted remaining battery level.
Figure 21:
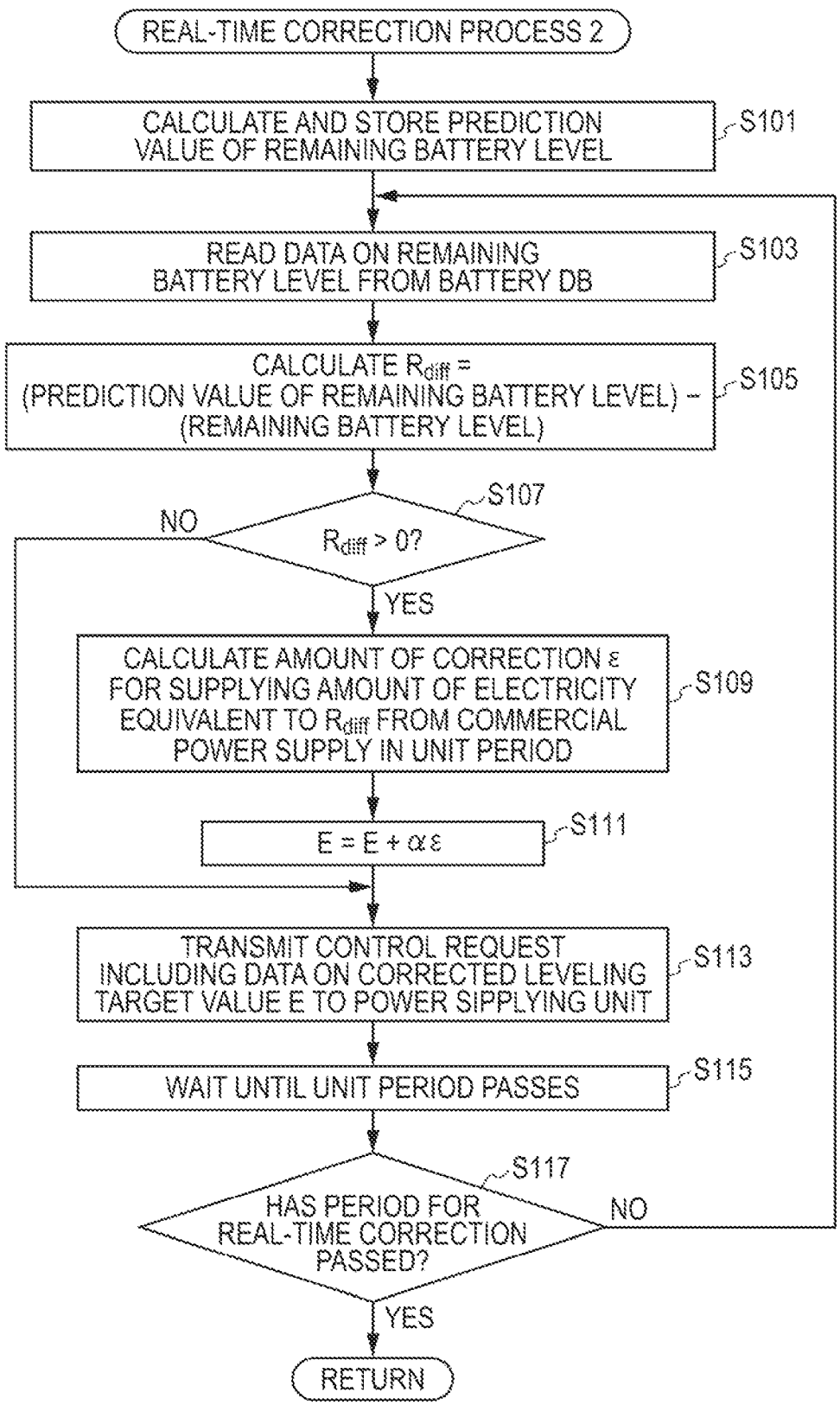
FIG. 21 illustrates a processing flow of second real time correction processing.

However, like the example in FIG. 20, the speed of decrease of the remaining battery level may sometimes be higher than predicted. In the example in FIG. 20, since the speed of decrease of the remaining battery level is higher than predicted, the remaining battery level reaches 0% at a time T3 if the remaining battery level keeps decreasing at the speed. Accordingly, in the example in FIG. 20, the leveling desirable value is set to a higher value from the time T1 to the time T2. Thus, the speed of decrease of the remaining battery level can be reduced, which can prevent the remaining battery level from reaching 0%. As will be described below, according to this embodiment, the degree of deviation of the remaining battery level is monitored every lapse of a unit period (such as 30 minutes), and the leveling desirable value is corrected as required. Thus, the peak value of the power supplied from a commercial power supply can be prevented from being significantly higher.

Next, with reference to FIG. 21, details of real time correction processing (step S13) according to this embodiment will be described. First of all, the amount-of-correction calculating unit 3031 calculates the prediction value of the remaining battery level and stores it in a storage such as a main memory (FIG. 21, step S101). The processing in step S101 uses data on a leveling desirable value E, a power demand prediction value D and a battery specification to perform the same processing as in step S25 and S27. In step S101, the prediction value of the remaining battery level for a period (such as one day) for performing the real time correction is calculated.

Next, the amount-of-correction calculating unit 3031 instructs the short-term tendency data generating unit 307 to notify data on the actual remaining battery level. The short-term tendency data generating unit 307 reads the data on the remaining battery level at the point in time when the real time correction processing is performed from the battery DB 315 and notifies it to the amount-of-correction calculating unit 3031 (step S103).

The amount-of-correction calculating unit 3031 subtracts the predicted remaining battery level calculated in step S101 from the actual remaining battery level notified in step S103 to calculate an Rdiff and stores it in a storage such as a main memory (step S105).

The amount-of-correction calculating unit 3031 then determines whether it is Rdiff>0 or not (step S107). If it is not Rdiff>0 (No in step S107), the processing moves to step S113. In step S107, while whether Rdiff is higher than 0 or not is determined, whether Rdiff is higher than a predetermined threshold value or not may be determined.

On the other hand, if it is determined Rdiff>0 (Yes in step S107), the amount-of-correction calculating unit 3031 calculates the amount of correction ε for supplying the amount of electricity that is equivalent to Rdiff from a commercial power supply in a unit period and stores it in a storage such as a main memory (step S109). For example, ε=Rdiff/(unit period) may be used. The amount-of-correction calculating unit 3031 calculates a leveling desirable value $E=E_{pres}+\alpha\epsilon$ and stores it in a storage such as a main memory (step S111). For example, if α is equal to 0, the leveling desirable value E is not corrected. If α=1, E is corrected to compensate the entire remaining battery power shortage.

Next, the amount-of-correction calculating unit 3031 notifies the leveling desirable value E after the correction to the leveling control unit 3033. The leveling control unit 3033 generates a control request including data on the leveling desirable value E after the correction and transmits it to the power supplying unit 5 (step S113). The processing to be performed in the power supplying unit 5 after the processing in step S113 is as described according to the first embodiment.

The amount-of-correction calculating unit 3031 waits until a unit period passes (step S115). After a lapse of the unit period, whether the period in which the real time correction is to be performed has passed or not is determined (step S117). If not (No in step S117), the processing returns to step S103 to perform the process for the next unit period. If so on the other hand (Yes in step S103), the processing returns to the beginning and ends.

Performing the processing as described above can prevent running out of the battery and can suppress the peak value of the power supplied from a commercial power supply even when the remaining battery level decreases faster than expected.

Having described the embodiments of the present technology, the present technology is not limited thereto. For example, the function block diagrams of the power management server 3, power supplying unit 5 and measuring apparatus 7 do not typically correspond to the actual program modules.

The configurations of the tables are given for illustration purposes only, and the configurations are not typically required. The order of the steps may be changed in the processing flows if the processing results are the same. The steps may be performed in parallel.

The client-server type system illustrated in FIG. 1 is given for illustration purposes only, and it may be a standalone type system.

In the real time correction processing, if the actual power demand or remaining battery level exceeds the prediction, the leveling desirable value is corrected. However, the leveling desirable value may be corrected to a lower value if it falls to below the prediction.

In the example described above, the power management server 3 transmits a control request for the leveling desirable value to the power supplying unit 5 and controls the leveling desirable value through the power supplying unit 5. However, the power management server 3 may transmit a control request for the leveling desirable value to the commercial power supply 9 and directly control the leveling desirable value. The power supplying unit 5 calculates the amount to charge or discharge the battery 505 to control the charging/discharging to/from the battery 505 on the basis of the leveling desirable value notified from the power management server 3 and a measured power demand.

Figure 22:
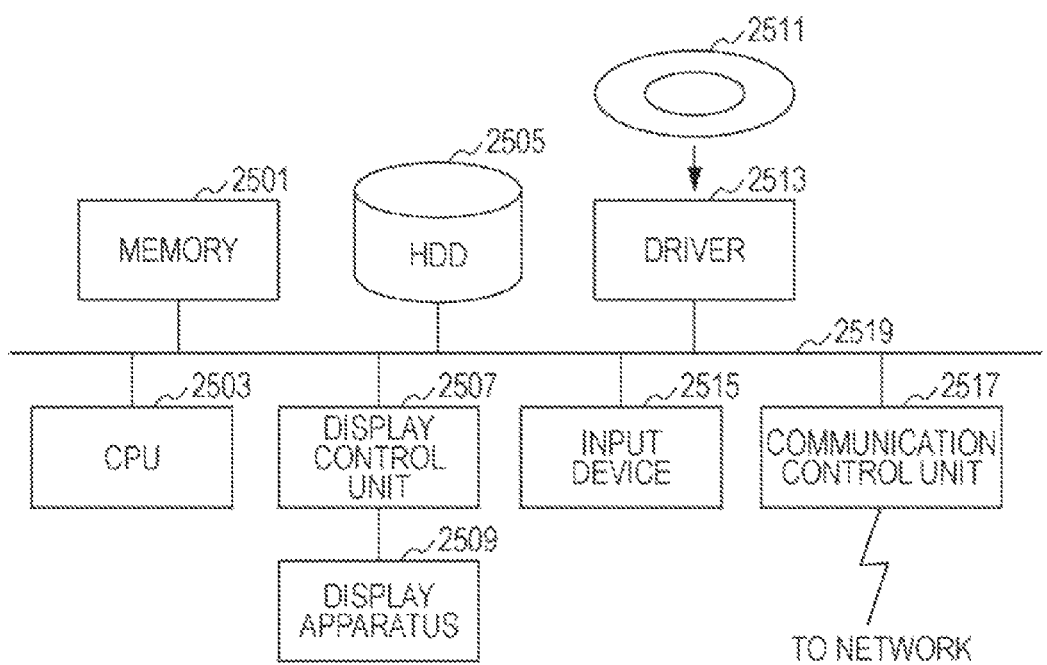
FIG. 22 is a function block diagram of a computer.

In the power management server 3 and management terminal 13, as illustrated in FIG. 22, a memory 2501 (storing unit), a CPU 2503 (processing unit), a hard disk drive (HDD) 2505, a display control unit 2507 connected to a display apparatus 2509, a driver 2513 for a removable disk 2511, an input device 2515, and a communication control unit 2517 for connecting to a network are connected via a bus 2519. Application programs including an OS and a Web browser are stored in the HDD 2505 and are read from the HDD 2505 to the memory 2501 to execute by the CPU 2503. When the necessity rises, the CPU 2503 controls the display control unit 2507, communication control unit 2517, and driver 2513 so as to perform necessary operations. Data being processed are stored in the memory 2501 and may be stored in the HDD 2505 if necessary. This kind of computer may implement the functions as described above with organic collaboration in hardware such as between the CPU 2503 and the memory 2501, an OS and a necessary application program.

A program causing a computer to perform processings according to the methods disclosed in the above embodiments may be generated. The program may be stored in a computer-readable storage medium or storage device such as a flexible disk, a CD-ROM, a magneto-optical disk, a semiconductor memory, and a hard disk, for example. The intermediate processing results may be temporarily stored in a storage such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power control method for a power supplying unit for supplying power from a commercial power supply and a battery to a load, comprising:
   calculating a deviation amount between an actual power demand and a predicted power demand in a predetermined unit period on the basis of power demand transition data and power demand prediction data, the power demand transition data being stored in a power database, the power demand prediction data being stored in a prediction data storing unit;
   correcting a leveling target value on the basis of the calculated deviation amount, the leveling target value being a target value of power to be supplied from the commercial power supply; and
   controlling the power supplying unit so that the power supplying unit supplies power corresponding to the corrected leveling target value from the commercial power supply.

2. The power control method according to claim 1, further comprising:
   predicting, for each of a plurality of candidate values for the leveling target value, power to be supplied from the commercial power supply during a predetermined period on the basis of the each candidate value, data on a battery specification and the power demand prediction data; and
   selecting one of the candidate values as the leveling target value, a peak value of the power predicted for the one of the candidate values being smallest among the plurality of candidate values.

3. The power control method according to claim 2, wherein the predicting includes:
   calculating, for each of the plurality of candidate values, charge and discharge amounts of the battery on the basis of the each candidate value, the data on the battery specification and the power demand prediction data, predicting a remaining battery level on the basis of the charge and discharge amounts of the battery, and predicting, for each of a plurality of candidate values, the power to be supplied from the commercial power supply during the predetermined period on the basis of the each candidate value, the power demand prediction data and data on the predicted remaining battery level.

4. The power control method according to claim 1, further comprising:

predicting, for each of a plurality of candidate values for the leveling target value, power to be supplied from the commercial power supply during a predetermined period on the basis of the each candidate value, data on a battery specification and the power demand prediction data;

calculating, for each of the plurality of candidate values, a exhausted amount of carbon dioxide during the predetermined period on the basis of data on the predicted power and data on an amount of carbon dioxide exhausted by generation of a unit amount of electricity; and selecting one of the candidate values as the leveling target value, a determination value being smallest among the plurality of candidate values, the determination value being defined by a peak value of the power predicted for the one of the candidate values and the exhausted amount of carbon dioxide calculated for the one of the candidate values.

5. The power control method according to claim 4, wherein the predicting includes:

calculating, for each of the plurality of candidate values, charge and discharge amounts of the battery on the basis of the each candidate value, the data on the battery specification and the power demand prediction data predicting a remaining battery level on the basis of the charge and discharge amounts of the battery, and predicting, for each of a plurality of candidate values, the power to be supplied from the commercial power supply during the predetermined period on the basis of the each candidate value, the power demand prediction data and data on the predicted remaining battery level.

6. A power control method for a power supplying unit for supplying power from a commercial power supply and a battery to a load, comprising:

calculating a deviation amount between an actual remaining battery level and a predicted remaining battery level in a predetermined unit period on the basis of battery level transition data and data on the predicted remaining battery level, the battery level transition data being stored in a battery database;

correcting a leveling target value on the basis of the calculated deviation amount, the leveling target value being a target value of power to be supplied from a commercial power supply; and controlling the power supplying unit so that the power supplying unit supplies power corresponding the corrected leveling target value from the commercial power supply.

7. The power control method according to claim 6, further comprising:

predicting a remaining battery level on the basis of the leveling target value, data on a battery specification and power demand prediction data, the power demand prediction data being stored in a prediction data storing unit.

8. A power control apparatus for a power supplying unit for supplying power from a commercial power supply and a battery to a load, comprising:

a deviation calculation unit for calculating a deviation amount between an actual power demand and a predicted power demand in a predetermined unit period on the basis of power demand transition data and power demand prediction data, the power demand transition data being stored in a power database, the power demand prediction data being stored in a prediction data storing unit;

a correction unit for correcting a leveling target value on the basis of the calculated deviation amount, the leveling target value being a target value of power to be supplied from the commercial power supply; and a control unit for controlling the power supplying unit so that the power supplying unit supplies power corresponding to the corrected leveling target value from the commercial power supply.

9. The power control apparatus according to claim 8, further comprising:

a power prediction unit for predicting, for each of a plurality of candidate values for the leveling target value, power to be supplied from the commercial power supply during a predetermined period on the basis of the each candidate value, data on a battery specification and the power demand prediction data; and a selection unit for selecting one of the candidate values as the leveling target value, a peak value of the power predicted for the one of the candidate values being smallest among the plurality of candidate values.

10. The power control apparatus according to claim 9, wherein the power prediction unit includes:

a charge and discharge calculation unit for calculating, for each of the plurality of candidate values, charge and discharge amounts of the battery on the basis of the each candidate value, the data on the battery specification and the power demand prediction data, and a battery level prediction unit for predicting a remaining battery level on the basis of the charge and discharge amounts of the battery, wherein the power prediction unit predicts, for each of a plurality of candidate values, the power to be supplied from the commercial power supply during the predetermined period on the basis of the each candidate value, the power demand prediction data and data on the predicted remaining battery level.

11. The power control apparatus according to claim 8, further comprising:

a power prediction unit for predicting, for each of a plurality of candidate values for the leveling target value, power to be supplied from the commercial power supply during a predetermined period on the basis of the each candidate value, data on a battery specification and the power demand prediction data;

an exhaustion calculation unit for calculating, for each of the plurality of candidate values, a exhausted amount of carbon dioxide during the predetermined period on the basis of data on the predicted power and data on an amount of carbon dioxide exhausted by generation of a unit amount of electricity; and a selection unit for selecting one of the candidate values as the leveling target value, a determination value being smallest among the plurality of candidate values, the determination value being defined by a peak value of the power predicted for the one of the candidate values and the exhausted amount of carbon dioxide calculated for the one of the candidate values.

12. The power control apparatus according to claim 11, wherein the power prediction unit includes:

a charge and discharge calculation unit for calculating, for each of the plurality of candidate values, charge and discharge amounts of the battery on the basis of the each candidate value, the data on the battery specification and the power demand prediction data, and a battery level prediction unit for predicting a remaining battery level on the basis of the charge and discharge amounts of the battery, wherein the power prediction unit predicts, for each of a plurality of candidate values, the power to be supplied from the commercial power supply during the predetermined period on the basis of the each candidate value, the power demand prediction data and data on the predicted remaining battery level.

13. A power control apparatus for a power supplying unit for supplying power from a commercial power supply and a battery to a load, comprising:

a calculation unit for calculating a deviation amount between an actual remaining battery level and a predicted remaining battery level in a predetermined unit period on the basis of battery level transition data and data on the predicted remaining battery level, the battery level transition data being stored in a battery database;

a correction unit for correcting a leveling target value on the basis of the calculated deviation amount, the leveling target value being a target value of power to be supplied from a commercial power supply; and a control unit for controlling the power supplying unit so that the power supplying unit supplies power corresponding the corrected leveling target value from the commercial power supply.

14. The power control apparatus according to claim 13, further comprising:

a battery level prediction unit for predicting a remaining battery level on the basis of the leveling target value, data on a battery specification and power demand prediction data, the power demand prediction data being stored in a prediction data storing unit.

* * * * *